United States Patent
Van Der Horst

(10) Patent No.: US 12,533,183 B2
(45) Date of Patent: Jan. 27, 2026

(54) GUIDED RENAL DENERVATION USING NERVE STIMULATION WITH BLOOD PRESSURE AND RENAL BLOOD VELOCITY MEASUREMENTS, AND ASSOCIATED SYSTEMS, DEVICE, AND METHODS

(71) Applicant: KONINKLIJKE PHILIPS N.V., Eindhoven (NL)

(72) Inventor: Arjen Van Der Horst, Tilburg (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 494 days.

(21) Appl. No.: 18/086,511

(22) Filed: Dec. 21, 2022

(65) Prior Publication Data

US 2023/0225791 A1 Jul. 20, 2023

Related U.S. Application Data

(60) Provisional application No. 63/300,536, filed on Jan. 18, 2022.

(51) Int. Cl.
*A61B 18/14* (2006.01)
*A61B 18/00* (2006.01)
*A61B 90/00* (2016.01)

(52) U.S. Cl.
CPC ............ *A61B 18/1492* (2013.01); *A61B 2018/00404* (2013.01); *A61B 2018/00434* (2013.01); *A61B 2018/00511* (2013.01); *A61B 2018/00577* (2013.01); *A61B 2018/00648* (2013.01); *A61B 2018/00666* (2013.01); *A61B 2018/00773* (2013.01); *A61B 2018/00839* (2013.01); *A61B 2018/00863* (2013.01); *A61B 2090/064* (2016.02)

(58) Field of Classification Search
CPC .......... A61B 18/1492; A61B 2090/064; A61B 2018/00404; A61B 2018/00434; A61B 2018/00511; A61B 2018/00577; A61B 2018/00648; A61B 2018/00666; A61B 2018/00773; A61B 2018/00863
USPC ........................................................ 606/41
See application file for complete search history.

(56) References Cited

U.S. PATENT DOCUMENTS

| | | | |
|---|---|---|---|
| 10,478,249 B2 * | 11/2019 | Gross | A61N 1/36017 |
| 2014/0276124 A1 | 9/2014 | Cholette | |
| 2015/0289770 A1 * | 10/2015 | Wang | A61B 5/0205 606/41 |

(Continued)

FOREIGN PATENT DOCUMENTS

WO WO-2014188430 A2 * 11/2014 ............. A61B 18/04

OTHER PUBLICATIONS

Booth, Lindsea C. et al."Reinnervation Following Catheter-based Radio-Frequency Renal Denervation", Symposium Report, Experimental. Physiology, vol. 100.5, 2015, pp. 485-490.

*Primary Examiner* — Beverly M Flanagan

(57) ABSTRACT

A system includes a processor circuit configured to receive an endovascular flow measurement obtained by an endovascular flow measurement positioned within a blood vessel of a patient. The system controls a nerve stimulation device to stimulate a nerve of the patient and receives an additional endovascular flow measurement while the nerve is stimulated. The processor circuit then performs a comparison of the two flow measurements received and provides an output based on the comparison.

17 Claims, 22 Drawing Sheets

(56) References Cited

U.S. PATENT DOCUMENTS

2017/0172651 A1     6/2017   Gross
2017/0215950 A1     8/2017   Gross
2017/0326363 A1*  11/2017   Deem ................... A61N 1/0551
2021/0383908 A1*  12/2021   Foin ....................... G16H 50/20

* cited by examiner

| Pre-ablation | Difference | Post-ablation |
|---|---|---|
| 1812 ↗ MAP Index: ## | 1842 ↗ ## | 1852 ↗ MAP Index: ## |
| 1814 ↗ HR Index: ## | 1844 ↗ ## | 1854 ↗ HR Index: ## |
| 1816 ↗ RBF Index: ## | 1846 ↗ ## | 1856 ↗ RBF Index: ## |
| 1818 ↗ RVC Index: ## | 1848 ↗ ## | 1858 ↗ RVC Index: ## |

1860 ↗ Ablation: Successful or Unsuccessful

1862 ↗ Ablation should be: Repeated or Not Repeated

1864 ↗ Ablation Location: Same or Move

Fig. 18

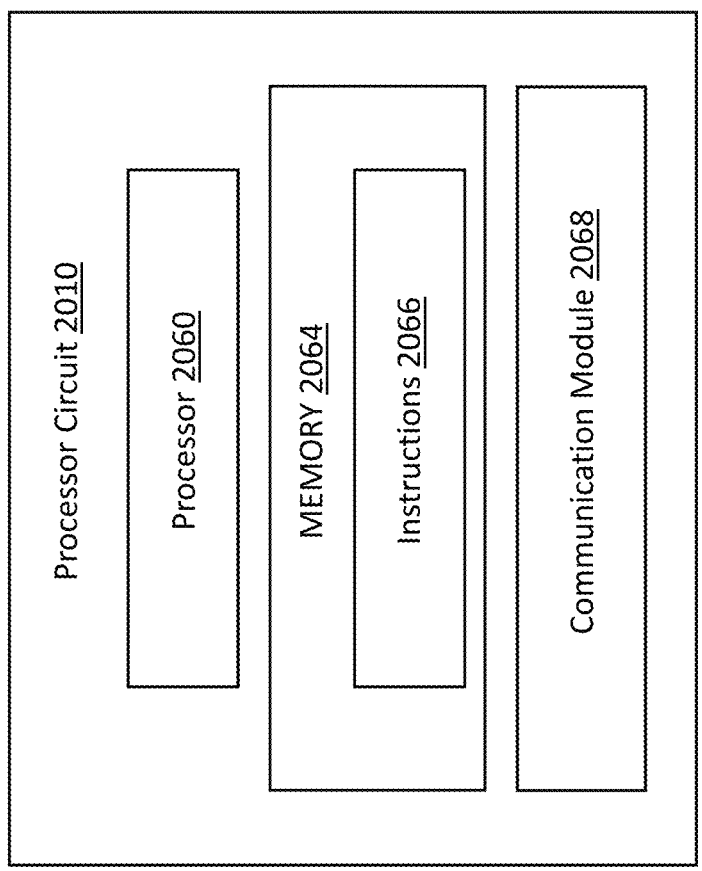

GUIDED RENAL DENERVATION USING NERVE STIMULATION WITH BLOOD PRESSURE AND RENAL BLOOD VELOCITY MEASUREMENTS, AND ASSOCIATED SYSTEMS, DEVICE, AND METHODS

CROSS-REFERENCE TO RELATED APPLICATIONS

This application claims priority to and the benefit of U.S. Provisional Application No. 63/300,536, filed Jan. 18, 2022, which is incorporated by reference herein in its entirety.

TECHNICAL FIELD

The present disclosure relates generally to guided renal denervation. In particular, blood flow and blood pressure within the renal artery are measured during stimulation of the renal nerves and compared with baseline measurements to stratify patients based on their likelihood to respond to a renal denervation procedure.

BACKGROUND

Physicians use many different medical diagnostic systems and tools to monitor a patient's health and diagnose medical conditions. In the field of assessing and treating hypertension in patients, various systems and devices are used to monitor a patient's condition and perform treatment procedures. One treatment procedure used to address hypertension of a patient is renal denervation. Renal denervation involves ablating or otherwise disabling the nerves of the renal artery. Because the renal nerves cause the renal artery to expand or contract in response to various stimuli, the renal nerves may be a cause of unnecessary high blood pressure in a patient. By disabling these nerves, blood pressure may be decreased.

However, renal denervation is not an effective treatment in all patients or at all locations within the renal vasculature of a patient. It is often difficult for a physician to determine whether a renal denervation will effectively address hypertension for a patient as results of renal denervation are highly patient-specific. As a result, a physician may perform a renal denervation procedure without success. This may be because the patient was not a patient which would respond positively to a renal denervation procedure or because the renal denervation procedure was performed in an incorrect region of the renal vasculature. Performing a renal denervation procedure with little to no effect on the patient unnecessarily subjects a patient to a traumatic and time-consuming procedure and wastes costly resources.

SUMMARY

Embodiments of the present disclosure are systems, devices, and methods for guided renal denervation using nerve stimulation with blood pressure and renal blood velocity measurements. Aspects of the disclosure advantageously assist physicians in determining whether a patient would be an appropriate candidate for a renal denervation procedure, whether a position within the renal vasculature is an appropriate position for ablation of renal nerves, and whether a renal denervation procedure performed previously was effective.

In some aspects, an endovascular device may be positioned in the renal artery of the patient. The device includes electrodes which may both stimulate surrounding renal nerves and ablate renal nerves. The device also includes a flow sensor for measuring blood velocity and a pressure sensor for measuring pressure. While the flow sensor and pressure sensor continuously obtain blood flow and pressure data, the electrodes of the device emit electrical energy for a period of time, stimulating the surrounding renal nerves.

A processor circuit in communication with the endovascular device receives the blood flow and pressure data with corresponding time data. The processor circuit may use the blood flow and pressure data to additionally determine a heart rate of the patient throughout the procedure as well as a renal vascular conductance measurement throughout the procedure. The processor circuit then compares the data corresponding to the period of time when the electrodes stimulated the renal nerves with the data corresponding to no stimulation (baseline data).

Based on this comparison, the processor circuit may determine to what extent the patient responded to the stimulation. For example, a significant change in blood flow, blood pressure, heart rate, or vascular conductance indicates that the patient responded to the stimulation. If a significant change in the data is observed and if the data was received prior to a renal denervation procedure, the processor circuit may determine either that the patient will respond well to a renal denervation procedure (e.g., a renal denervation procedure will result in a decrease in hypertension) or that the location of the endovascular device corresponds to a renal nerve that is a good candidate for ablation (e.g., that ablating the renal nerve will result in a decrease in hypertension. If no change in the data is observed and if the data was received after a renal denervation procedure, the processor circuit may determine that the renal denervation procedure was successful.

In an exemplary aspect, a system is provided. The system includes a processor circuit configured for communication with an endovascular flow sensor and an endovascular nerve stimulation device, wherein the processor circuit is configured to: receive a first endovascular flow measurement obtained by an endovascular flow sensor while the endovascular flow sensor is positioned is positioned within a blood vessel of the patient; control an endovascular nerve stimulation device to stimulate a nerve of the patient, wherein the nerve is proximate to the blood vessel, wherein the first endovascular flow measurement is obtained before the nerve is stimulated; receive a second endovascular flow measurement obtained by the endovascular flow sensor while the nerve is stimulated; perform a comparison based on the first endovascular flow measurement and the second endovascular flow measurement; and provide, to a display in communication with the processor, an output based on the comparison.

In one aspect, the blood vessel comprises a renal artery, and wherein the nerve comprises a renal nerve. In one aspect, the nerve stimulation device includes at least one electrode. In one aspect, the system further includes an endovascular catheter or guidewire configured to be positioned within the blood vessel, wherein the endovascular catheter or guidewire comprises the flow sensor and the nerve stimulation device. In one aspect, the system further includes a first endovascular catheter or guidewire configured to be positioned within the blood vessel, wherein the first endovascular catheter or guidewire comprises the endovascular flow sensor; and a second endovascular catheter or guidewire configured to be positioned within the blood vessel, wherein the second endovascular catheter or guidewire comprises the nerve stimulation device. In one aspect, the comparison comprises a determination of whether a difference between the first flow measurement and the second flow measurement exceeds a threshold difference. In one aspect, the comparison comprises a determination of whether denervation is recommended for the patient, and the output comprises a visual representation of the determination. In one aspect, the comparison comprises a determination of whether a denervation was successful, and the output comprises a visual representation of the determination. In one aspect, the processor circuit is further configured to receive an endovascular pressure measurement obtained by an endovascular pressure sensor, the comparison is further based on the endovascular pressure measurement, and the output comprises a visual representation of the endovascular pressure measurement. In one aspect, the system further includes an endovascular catheter or guidewire configured to be positioned within the blood vessel, and the endovascular catheter or guidewire comprises the endovascular flow sensor, the endovascular nerve stimulation device, and the endovascular pressure sensor. In one aspect, the processor circuit is configured to determine a heart rate of the patient based on the endovascular pressure measurement, the comparison is further based on the heart rate, and the output comprises a visual representation of the heart rate. In one aspect, the processor circuit is configured to determine a vascular conductance of the patient based on the endovascular pressure measurement and at least one of the first endovascular flow measurement or the second endovascular flow measurement, the comparison is further based on the vascular conductance, and the output comprises a visual representation of the vascular conductance. In one aspect, the processor circuit is configured to determine whether the renal nerve is an afferent nerve or an efferent nerve, and the output comprises a visual representation of the determination. In one aspect, the processor circuit is configured to control the stimulation of the nerve by the endovascular nerve stimulation device based on at least one of the first endovascular flow measurement or a second endovascular flow measurement. In one aspect, to perform the comparison, the processor circuit is configured to determine an index based on the first flow measurement and the second flow measurement, and the output comprises a visual representation of the index.

In an exemplary aspect, a system is provided. The system includes one or more endovascular catheters or guidewires comprising an endovascular flow sensor and at least one electrode; a processor circuit configured for communication with the endovascular flow sensor and the at least one electrode, wherein the processor circuit is configured to: receive a first endovascular flow measurement obtained by the endovascular flow sensor while the endovascular flow sensor is positioned is positioned within a renal blood vessel of the patient; control the electrode to stimulate a renal nerve of the patient, wherein the first endovascular flow measurement is obtained before the nerve is stimulated; receive a second endovascular flow measurement obtained by the endovascular flow sensor while the nerve is stimulated; perform a comparison based on the first endovascular flow measurement and the second endovascular flow measurement; and provide, to a display in communication with the processor, an output based on the comparison.

Additional aspects, features, and advantages of the present disclosure will become apparent from the following detailed description.

BRIEF DESCRIPTION OF THE DRAWINGS

Illustrative embodiments of the present disclosure will be described with reference to the accompanying drawings, of which:

FIG. 18 is a diagrammatic view of a graphical user interface 1800 associated with a nerve stimulation procedure performed after a nerve ablation procedure, according to aspects of the present disclosure.

FIG. 20 is a schematic diagram of a processor circuit, according to aspects of the present disclosure.

DETAILED DESCRIPTION

Figure 1:
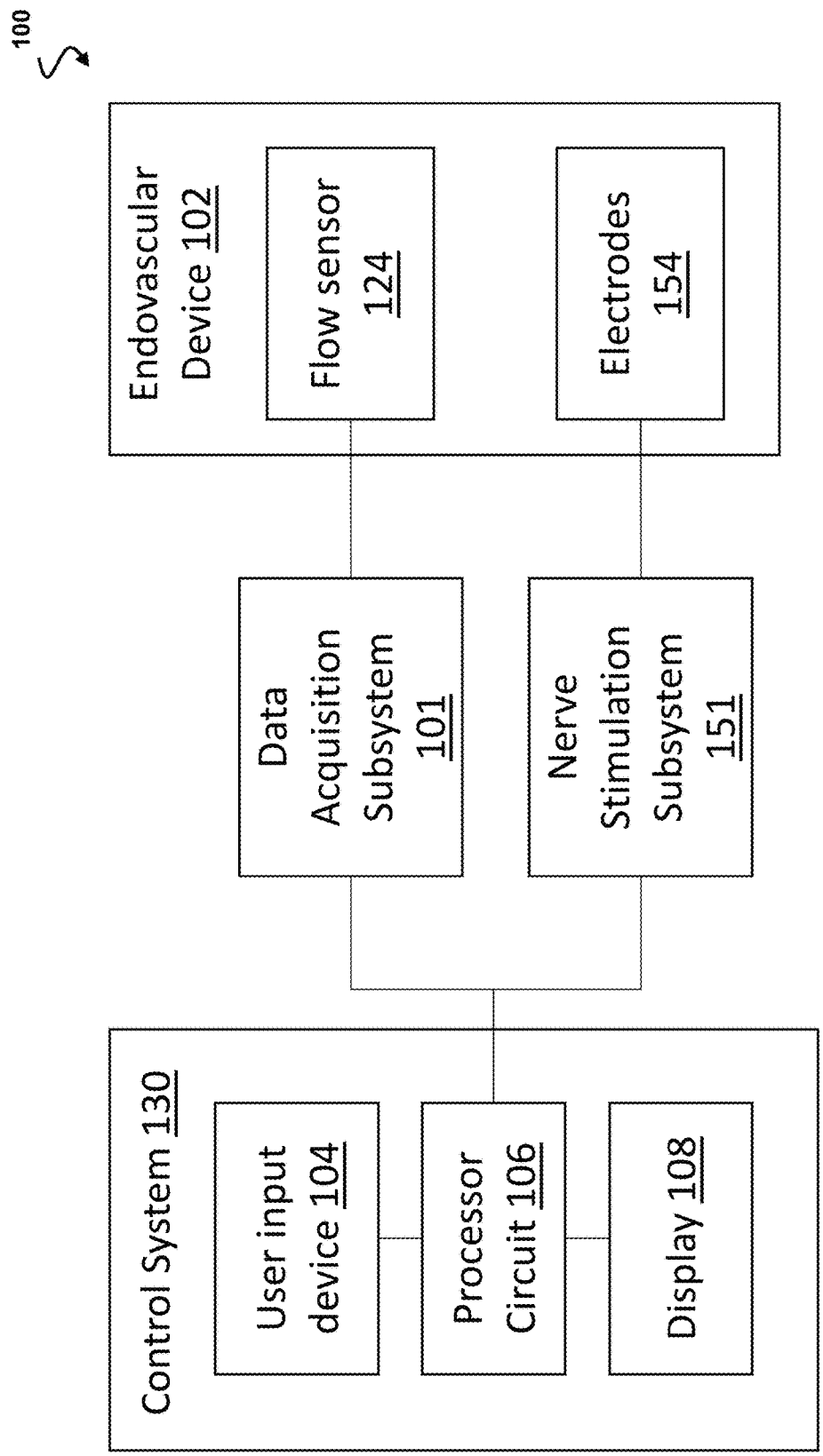
FIG. 1 is a schematic diagram of a data acquisition and nerve stimulation system, according to aspects of the present disclosure.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

FIG. 1 is a schematic diagram of a data acquisition and nerve stimulation system 100, according to aspects of the present disclosure. In some embodiments, and as shown in FIG. 1, the system 100 may include a control system 130, one or more subsystems, and one or more endovascular devices, such as the endovascular device 102.

The system 100 shown in FIG. 1 may advantageously assist a physician in treating hypertension in some patients. In addition, the system 100 shown in FIG. 1 may be configured to identify whether a patient is likely to respond positively to a renal denervation procedure. For example, the system 100 may be configured to stimulate renal nerves at a renal artery of the patient and measure one or more hemodynamic parameters. By comparing hemodynamic parameters obtained without stimulation with hemodynamic parameters obtained with stimulation, the system 100 may be able to determine, based on the physiological response of the patient to renal nerve stimulation, whether a patient's hypertension may be remedied or aided through a renal denervation procedure.

The control system 130 may be configured to generate various commands to control subsystems, such as the data acquisition subsystem 101 and/or the nerve stimulation subsystem 151. The control system 130 may be additionally configured to generate commands to control various devices. For example, the control system 130 may be configured to generate commands to control the endovascular device 102. In some embodiments, the control system 130 may be configured to generate command signals to control one or more sensors, such as the flow sensor 124. In addition, the control system 130 may be configured to generate command signals to control one or more electrodes, such as the electrodes 154 shown in FIG. 1.

The control system 130 may be any suitable device or system. For example, the control system 130 may include a user input device 104, a processor circuit 106, and/or a display 108. The control system 130 may include additional devices, components, or elements. In some embodiments, the control system 130 may be a computer, such as a laptop, a tablet device, or any other suitable computational device. In some embodiments, the control system 130 may include additional elements related to communication between the control system 130, or the processor circuit 106 of the control system 130, and other systems, subsystems, or devices. For example, the control system 130 may include an interface module. In some examples, the control system 130 may include a patient interface module (PIM).

In some embodiments, the control system 130 may additionally be configured to receive various data from other systems, subsystems, or devices. For example, the control system may be configured to receive data related to blood flow, or the velocity of blood within a vessel of a patient. The control system may receive blood flow data from a flow sensor, such as the flow sensor 124.

The user input device 104 may be any suitable device. For example, the user input device 104 may be configured to receive a user input via one or more buttons or mouse clicks. The user input device 104 may additionally be configured to receive a user input via any other method. For example, the user input device 104 may receive a user input via a touch on a touch screen, an auditory input such as speech or other sounds. In some embodiments, the user input device 104 may be a keyboard, a mouse, a touch screen, one or more buttons, a microphone, or any other suitable device configured to receive inputs from a user.

The processor circuit 106 may be configured to generate, receive, and or process any various data. For example, the processor circuit 106 may be in communication with the memory storage system of the control system 130. The processor circuit 106 may be configured to execute computer readable instructions stored on the memory storage system of the control system 130. The processor circuit 106 may additionally be configured to generate outputs based on any suitable computer readable instructions the circuit 106 may execute. For example, the processor circuit 106 may generate an output configured to be received by a flow sensor, such as the flow sensor 124, to begin to receive blood flow data. Similarly, the processor circuit 106 may generate an output to be received by a nerve stimulation device, instructing the nerve stimulation device to begin to stimulate nerves, such as renal nerves, with one or more electrodes. In some embodiments, the processor circuit 106 may be further configured to process data received from the devices with which the control system 130 is in communication. For example, the processor circuit 106 may process blood flow data from a flow sensor. The processor circuit 106 may additionally process other data. In some embodiments, the processor circuit 106 may be configured to generate one or more graphical user interfaces to be output to a display, such as the display 108. In some embodiments, the processor circuit 106 may be additionally configured to receive user inputs from a user input device, such as the user input device 104.

The display 108 may be any suitable display. The display 108 may also be any suitable device. For example, the display 108 may include one or more pixels configured to display regions of an image to a user of the system 100. The display 108 may be in communication with the processor circuit 106 of the control system 130. In this way, the display 108 may receive instructions and/or images to display to a user of the system 100. In some embodiments, the display 108 may show a user a view of the data received and/or processed by the processor circuit 106. The display 108 may additionally convey various recommended actions or prompts for the user of the system 100 from the processor circuit 106. In some embodiments, the display 108 may additionally or alternatively be a user input device. For example, the user of the system 100 may select various elements within a graphic shown on the display 108 to direct the processor circuit 106 of the control system 130 to perform various actions or commands.

The data acquisition subsystem 101 may be in communication with the processor circuit 106, as shown in FIG. 1. The data acquisition subsystem 101 may be any suitable device, system, or subsystem. For example, the data acquisition subsystem 101 may be configured to receive commands from the processor circuit 106 of the control system 130 and send these commands or signals to one or more devices, such as the endovascular device 102. In some embodiments, the data acquisition subsystem 101 may process signals received from the processor circuit 106. In this way, the data acquisition subsystem 101 may facilitate communication between the processor circuit 106 and a device, such as the endovascular device 102. In some embodiments, the data acquisition subsystem 101 may be configured to control a flow sensor 124. In this way, the data acquisition subsystem 101 and the flow sensor 124 may together form a blood flow sensing system. For example, the flow sensor 124 may be configured to receive data within a blood vessel of a patient related to the flow or velocity of blood within a vessel. The flow sensor 124 may then transmit the received data relating to blood flow to the data acquisition subsystem 101. The data acquisition subsystem 101 may be configured to pre-process the data received from the flow sensor 124. For example, the data acquisition subsystem 101 may smooth, average, or perform any other suitable preprocessing functions on the flow data received. The data acquisition subsystem 101 may then be configured to transmit the data received by the flow sensor 124, which optionally may be preprocessed by the subsystem 101, to the processor circuit 106.

The nerve stimulation subsystem 151 may be configured to control one or more electrodes of a nerve stimulation device. For example, the nerve stimulation device may be the endovascular device 102. In some embodiments, the endovascular device 102 may include elements of a nerve stimulation device. For example, the endovascular device 102 may include one or more electrodes 154. In some embodiments, and as shown in FIG. 1 the endovascular device 102 may include a flow sensor 124 and electrodes 154. In this way, the endovascular device 102 may be configured to both receive blood flow or velocity data via the flow sensor 124 and stimulate nerves of a blood vessel via the electrodes 154. The nerve stimulation subsystem 151 may be configured to receive command signals from the processor circuit 106. For example, in response to a user input from the user of the system 100, or in response to other computer readable instructions, the processor circuit 106 may generate a command for the nerve stimulation subsystem 151 to begin to emit electrical pulses intended to stimulate nerves of a blood vessel, such as a renal artery. In such an embodiment, the nerve stimulation subsystem 151 may receive such a command from the processor circuit 106 and may generate one or more electrical pulses or electrical signals and transmit these pulses or signals to the electrodes 154. In response to receiving an electrical pulse, the electrodes 154 may transmit electrical energy into the surrounding environment, such as a blood vessel of a patient. Similarly, the processor circuit 106 may transmit a command to the nerve stimulation subsystem 151 to stop stimulating the nerves of a blood vessel. For example, the processor circuit 106 may generate a command to stop the electrodes from emitting electrical pulses or signals. In response to such a command, the nerve stimulation subsystem 151 may then stop sending electrical pulse or signal to the electrodes 154.

As shown in FIG. 1, the endovascular device 102 maybe a single device configured to perform multiple functions. For example, the endovascular device 102 may receive blood flow data from the blood flow sensor 124 and may stimulate nerves of a blood vessel with one or more electrodes 154. However, as will be described in greater detail hereafter, in some embodiments, a flow sensor, such as the flow sensor 124 may be housed on a separate device from the device containing the electrodes 154. In some aspects, an endovascular device or endovascular data may also be referred to as an intravascular device or intravascular data respectively. In some embodiments, the device may be referred to as an intraluminal, intra-cavity, or intra-body device. For example, the endovascular device may be a device positioned within a blood vessel or in any other body lumen/cavity, including outside a vessel and within the body, such as proximate to muscle or fat, around a renal vessel/nerve and kidney).

As shown in FIG. 1, the data acquisition subsystem 101 and the nerve stimulation subsystem 151 may be separate subsystems. In some embodiments, the data acquisition subsystem 101 may be in communication with the flow sensor 124 of the endovascular device 102. Similarly, the nerve stimulation subsystem 151 may be in communication with the electrodes 154 of the same endovascular device 102. However, in some embodiments, the data acquisition subsystem 101 and the nerve stimulation subsystem 151 may be the same subsystem. For example, this combined subsystem may be configured to both send and receive data or commands related to the acquisition of blood flow or velocity data and additionally send and receive commands and or electrical pulses related to the electrodes 154.

The flow sensor 124 of the endovascular device 102 may be any suitable flow sensor. The flow sensor 124 may be configured to be positioned within a body lumen of a patient. The flow sensor 124 may acquire blood flow data, such as blood velocity data, related to blood within a blood vessel of a patient. In some embodiments, the flow sensor 124 may include a sensing component, a housing, and an acoustic matching layer, among other components. In some embodiments, the flow sensor 124 may include a transducer element The flow sensor 124 can be an electronic, electromechanical, mechanical, optical, and/or other suitable type of sensor. For example, the flow sensor 124 can be a flow sensor configured to measure the velocity of blood flow within a blood vessel of a patient, a pressure sensor configured to measure a pressure of blood flowing within the vessel, a vascular flow reserve sensor configured to measure vascular flow reserve, a renal flow reserve sensor configured to measure renal flow reserve, or another type of sensor including but not limited to a temperature or imaging sensor. For example, flow data obtained by a flow sensor can be used to calculate physiological variables such as coronary flow reserve (CFR). Additional aspects of the flow sensor 124 will be described in more detail with reference to FIG. 2A.

The endovascular device 102 may additionally include the electrodes 154. The electrodes 154 may be configured to contact or approximate a vessel luminal wall. When the electrodes 154 are in contract with or proximate to a vessel luminal wall, the electrodes 154 may emit an electrical pulse or a constant electrical voltage. The electrical field created by the electrodes 154 may stimulate nerves of the vessel positioned near the vessel wall. This in turn may cause the walls of the vessel to expand or contract based on the electrical field. Additional aspects of the electrodes 154 will be described in more detail with reference to FIGS. 2A-2D.

Figure 2A:
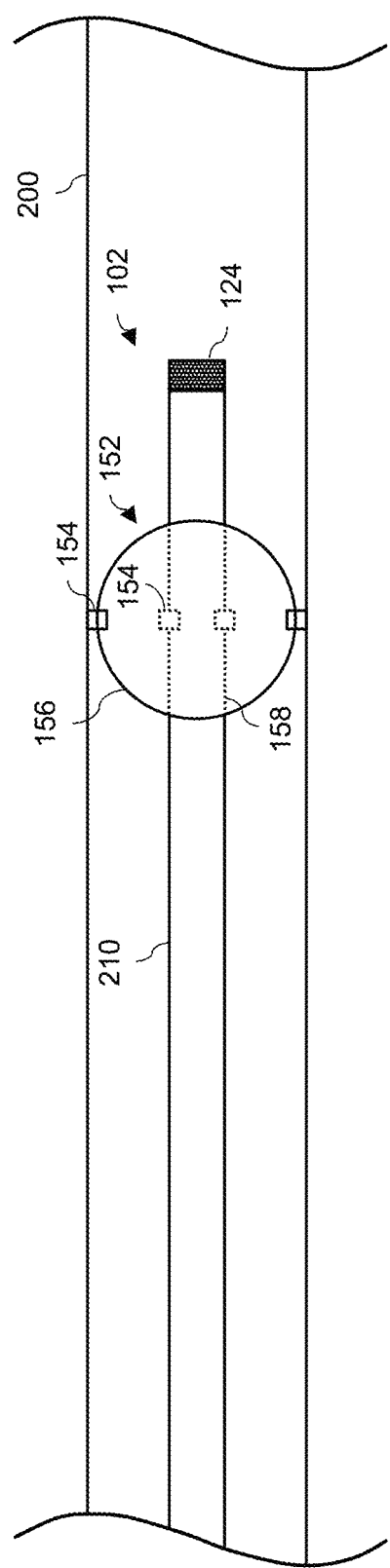
FIG. 2A is a schematic diagram of a blood flow sensing and nerve stimulation device, according to aspects of the present disclosure.

FIG. 2A is a schematic diagram of a blood flow sensing and nerve stimulation device 102, according to aspects of the present disclosure. As shown in FIG. 2A, the device 102 may be configured to be positioned within a blood vessel of a patient. For example, as shown in FIG. 2A, a diagrammatic view of a blood vessel 200 is provided.

The blood flow sensing and nerve stimulation device 102 may include a flexible elongate member 210, a nerve stimulation assembly 152, and the blood flow sensor 124 described with reference to figure one.

The flexible elongate member 210 may be sized and shaped, structurally arranged, and/or otherwise configured to be positioned within a body lumen 200 of a patient. The flexible elongate member 210 may be a part of guidewire and/or a catheter (e.g., an inner member and/or an outer member). The flexible elongate member 210 may be constructed of any suitable flexible material. For example, the flexible elongate member 210 may be constructed of a polymer material including polyethylene, polypropylene, polystyrene, or other suitable materials that offer flexibility, resistance to corrosion, and lack of conductivity. In some embodiments, the flexible elongate member 210 may define a lumen for other components to pass through. The flexible elongate member 210 may be sufficiently flexible to successfully maneuver various turns or geometries within the vasculature of a patient. The flexible elongate member 210 may be of any suitable length or shape and may have any suitable characteristics or properties.

The nerve stimulation assembly 152 may include a device configured to move the one or more electrodes 154 in a radial direction such that the electrodes 154 contact, or are positioned proximate to, the inner surface of the vessel wall of the vessel 200. The nerve stimulation assembly 152 may be of any suitable type. In one example, the nerve stimulation assembly 152 may be referred to as a thermal basket catheter. For example, the assembly 152 may include one or more support arms. The support arms may include a flexible or semi-flexible material. The one or more electrodes 154 may be positioned on an outer surface of the support arms. In this way, the support arms may be configured to move the electrodes in a radial direction.

As shown in FIG. 2A, the nerve stimulation assembly 152 may be moved between various positions. For example, the solid lines 156 of the assembly 152 as shown may correspond to a depiction of the assembly in an expanded condition. The processor circuit 106 and/or a user of the system 100 may direct that the assembly 152 assume an expanded condition in order to stimulate nerves of the vessel 200, as will be described. The dotted lines 158 shown in FIG. 2A may correspond to a view of the assembly 152 in a collapsed condition. The assembly 152 may assume a collapsed position during movement of the device 102. As shown, while in an expanded state, the maximum outer diameter of the endovascular device 102 may be larger than the maximum outer diameter of the device 102 in a collapsed state. Specifically, the outer diameter of the device 102 at the assembly 152 may be substantially equal to the diameter of the lumen of the vessel 200 at the position of the nerve stimulation assembly 152 when the assembly 152 is in an expanded condition. However, in a collapsed position, as shown by the dotted lines 158, the diameter of the assembly 152 may be the same or similar to the diameter of other regions of the device 102, such as the cross-sectional diameter of the flexible elongate member 210.

The endovascular device 102 shown in FIG. 2A may also include the flow sensor 124. The flow sensor 124, as shown in FIG. 2A, may be disposed at a distal tip of the device 102. In some embodiments, the flow sensor 124 may be disposed at a distal tip of the flexible elongate member 210. The flow sensor 124 may include an electronic component mounted within a housing. The electronic component of the flow sensor 124 may be in communication with a flexible tip coil extending from the distal portion of the flexible elongate member 210.

Flow data obtained by the flow sensor 124 may be transmitted to another system or subsystem (e.g., to the data acquisition subsystem 101 and/or the control system 130) via conductive portions of the device 102, including, for example, conductive cables extending along the flexible elongate member 210 in communication with the control system or subsystem. Control signals (e.g., operating voltage, start/stop commands, etc.) from a processor circuit (e.g., the processor circuit 106) in communication with the intravascular device 102 can be transmitted to the flow sensor via the conductive cables. In some embodiments, the conductive cables may include a multi-filar conductor bundle, one or more layers of insulative polymer/plastic surrounding conductive members and a core. For example, the polymer/plastic layer(s) can insulate and protect the conductive members of the multi-filar cable or conductor bundle.

In various embodiments, the intravascular device 102 can include one, two, three, or more core wires extending along its length. For example, in one embodiment, a single core wire extends substantially along the entire length of the flexible elongate member 210.

In some embodiments, a connector may provide electrical connectivity between the conductive cables and a patient interface module or patient interface monitor. The patient interface module (PIM) may in some cases connect to a console or processing system, such as the data acquisition subsystem 101 or the control system 130. In some embodiments, the patient interface module includes signal processing circuitry, such as an analog-to-digital converter (ADC), analog and/or digital filters, signal conditioning circuitry, and any other suitable signal processing circuitry for processing the signals provided by the flow sensor 124 for use by the processor circuit 106.

Referring again to FIG. 1, the system 100 may be deployed in a catheterization laboratory having a control room. In some embodiments, the control system 130 may be located in the control room. Optionally, the control system 130 may be located elsewhere, such as in the catheterization laboratory itself. The catheterization laboratory may include a sterile field while its associated control room may or may not be sterile depending on the procedure to be performed and/or on the health care facility. In some embodiments, device 102 may be controlled from a remote location such as the control room, such than an operator is not required to be in close proximity to the patient.

The intraluminal device 102, data acquisition subsystem 101, and display 108 may be communicatively coupled directly or indirectly to the processor circuit 106 of the control system 130 These elements may be communicatively coupled to the processor circuit 106 via a wired connection such as a standard copper multi-filar conductor bundle. The processing circuit 106 may also be communicatively coupled to one or more data networks, e.g., a TCP/IP-based local area network (LAN). In other embodiments, different protocols may be utilized such as Synchronous Optical Networking (SONET). In some cases, the processor circuit 106 may be communicatively coupled to a wide area network (WAN).

After flow data signals are received by the processing system 106, the information is processed and displayed on the display 108. The control system 130 can include a processor and a memory, as described.

In some embodiments, the flow sensor 124 may include a sensor assembly. As indicated by the position of the flow sensor 124 illustrated in FIG. 2A, the flow sensor 124 may be included in a distal portion of the intravascular device 102 such that a surface of the flow sensor 124 faces distally.

In some embodiments, one or more surfaces of the flow sensor 124 may be coated in an insulating layer. The insulating layer may be formed from parylene, which may be deposited on the one or more surfaces, for example. The insulating layer may additionally or alternatively be formed from any other suitable insulating material. In some embodiments, the insulating layer may prevent a short (e.g., an electrical failure), which may otherwise be caused by contact between a conductive portion of the flow sensor 124 and its housing, which may be formed with a metal.

In some embodiments, the flow sensor 124 may include a transducer element, such as an ultrasound transducer element on the distal surface such that the transducer element faces distally and may be used by the flow sensor 124 to obtain sensor data corresponding to a structure distal of the flow sensor 124. The flow sensor 124 may additionally or alternatively include a transducer element on a proximal surface such that the transducer faces proximally and may be used to obtain sensor data corresponding to a structure proximal of the sensing component. A transducer element may additionally or alternatively be positioned on a side surface (e.g., on a perimeter or circumference) of the flow sensor 124 in some embodiments.

In some embodiments, the flow sensor 124 may include an acoustic matching layer. This acoustic matching layer may be positioned on (e.g., over) the distal surface of the flow sensor 124. In particular, the acoustic matching layer may be disposed directly on the flow sensor 124, or the acoustic matching layer may be disposed on the insulating layer coating the flow sensor 124. The acoustic matching layer may provide acoustic matching to the flow sensor 124 (e.g., to an ultrasound transducer of the flow sensor 124). For instance, the acoustic matching layer may minimize any acoustic impedance mismatch between the ultrasound transducer and a surrounding medium, such as a fluid 934 and/or a lumen that the intravascular device 102 is positioned within. In that regard, the acoustic matching layer may be formed from any suitable material, such as a polymer or an adhesive, to provide acoustic matching with the flow sensor 124.

In some embodiments, the endovascular device 102 may be positioned around a guidewire. For example, an inner lumen of device 102 may extend longitudinally through a cross-sectional central portion of device 102. The lumen may be defined by the device 102 and may be sized and shaped to receive a guidewire. In such an embodiment, during a measurement and/or stimulation procedure, a guidewire sized and shaped for positioning within a vessel of a patient may be first positioned within a vessel of the patient. In one example, the guidewire may be placed within a renal artery of the patient. After the guidewire is positioned within the vessel, the endovascular device 102 may be positioned around the guidewire. In this way, the endovascular device may be moved along the guidewire to the same position in, for example, the rental artery.

In an embodiment in which the endovascular device is configured to be positioned around a guidewire within the lumen, the flow sensor 124 may include a ring-shaped ultrasound transducer. In some embodiments, multiple ultrasound transducers may be positioned on a distal surface of the flow sensor 124. For example, the multiple ultrasound transducers may be arranged in a ring shape such that they are positioned around the guidewire. In some embodiments, the flow sensor 124 may be a thermoelectric sensor.

Figure 2B:
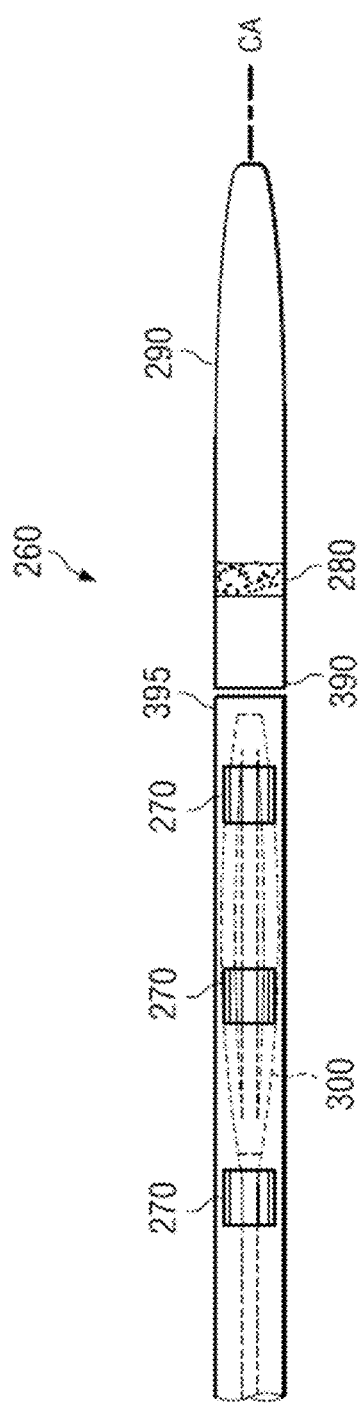
FIG. 2B is a schematic diagram of a nerve stimulation device in a collapsed state, according to aspects of the present disclosure.

FIG. 2B is a schematic diagram of a distal portion 260 of a nerve stimulation device in a collapsed state, according to aspects of the present disclosure. The endovascular device described previously with reference to FIG. 1 and FIG. 2A may include features similar to those of the nerve stimulation device shown in FIG. 2B.

Various aspects of the flow sensing and nerve stimulation device 102 may include components or features similar to those described in U.S. Patent Publication No. 2013/0289369, which is hereby incorporated by reference in its entirety.

FIG. 2B illustrates at least a segment of the distal portion 260 of the endovascular device 102 in an unexpanded condition according to one embodiment of the present disclosure. In some instances, the device 102 includes components or features similar or identical to those disclosed in U.S. Patent Application Publication No. 2004/0176699, which is hereby incorporated by reference in its entirety. In the pictured embodiment, the distal tip 290 is positioned against the remainder of the body along the longitudinal axis CA, and the expandable structure 300 is compressed within the lumen in an unexpanded condition. The distal portion 260 includes a distal connection part 390, which is the proximal-most part of the distal tip 290, and a proximal connection part 395, which abuts the distal connection part 390 when the device 102 is in an unexpanded condition. In the pictured embodiment, the imaging apparatus 280 is positioned distal to the distal connection part 390. Additionally or alternatively, the imaging apparatus may be positioned proximal to the proximal connection part 395.

Figure 2C:
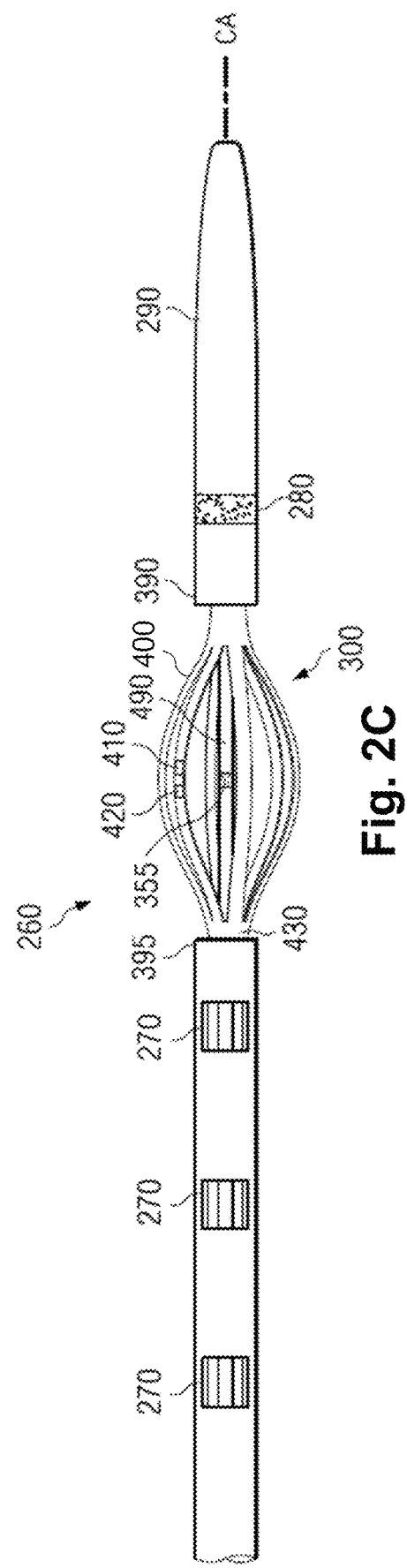
FIG. 2C is a schematic diagram of a nerve stimulation device in an expanded state, according to aspects of the present disclosure.

FIG. 2C is a schematic diagram of a distal portion 260 of a nerve stimulation device in an expanded state, according to aspects of the present disclosure. The endovascular device described previously with reference to FIG. 1, FIG. 2A, and/or FIG. 2B may include features similar to those of the nerve stimulation device shown in FIG. 2C.

FIG. 2C illustrates at least a segment of the distal portion 260 of the endovascular device 102 in an expanded condition according to one embodiment of the present disclosure. In the pictured embodiment, the distal tip 290 is moved distally away from the remainder of the body along the longitudinal axis CA to allow the expandable structure 300 to emerge from the lumen and assume an expanded condition. Specifically, the distal connection part 390 is separated axially away from the proximal connection part 395 along the axis CA. The user may transition the catheter 102 from an unexpanded condition to an expanded condition by manipulating a body actuator within an actuator recess to cause the distal tip 290 to move distally away from the remainder of the body. In the pictured embodiment, the expandable structure 300 is shown in a deployed and expanded condition wherein at least one support arm 400 has expanded outwardly. The expandable structure 300 includes six flexible support arms 400. In other embodiments, the expandable structure may include any number of support arms 400. At least one electrode 410 and at least one sensor 420 may be positioned on at least one of the support arms 400. The at least one electrode 410 and at least one sensor 420 will be described in further detail below with reference to FIG. 2D.

Figure 8:
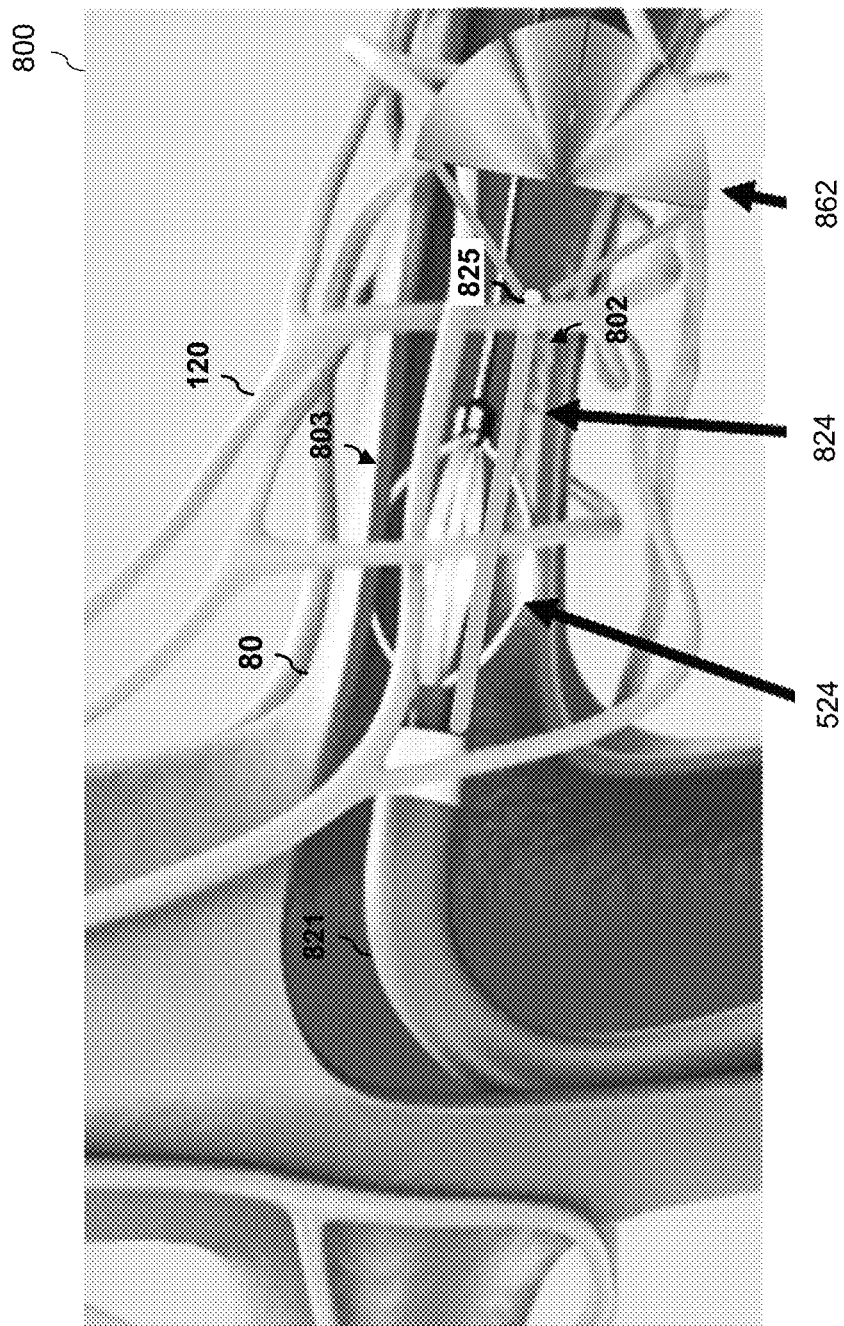
FIG. 8 is a diagrammatic view of a region of a patient anatomy, according to aspects of the present disclosure.
Figure 9:
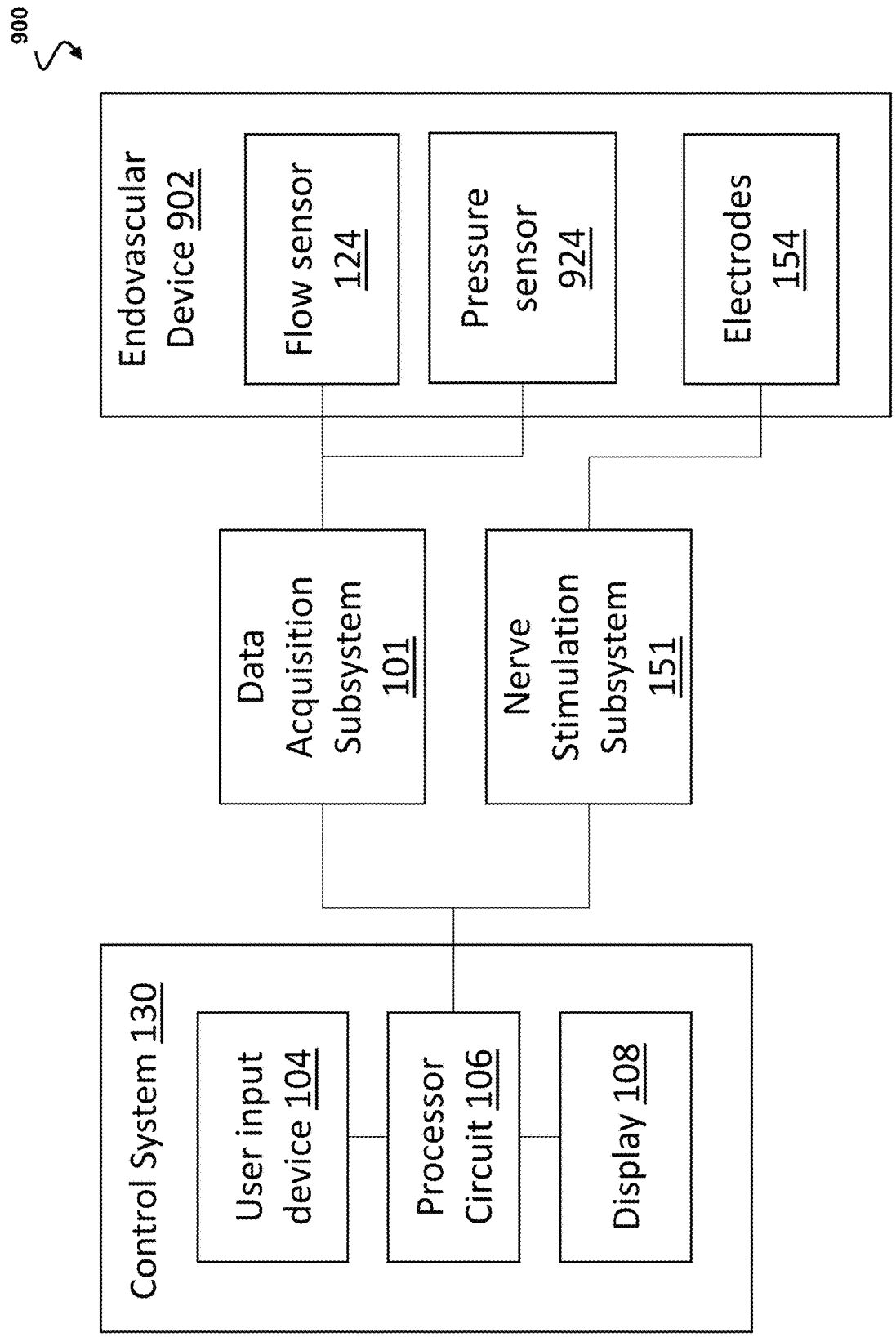
FIG. 9 is a schematic diagram of a data acquisition and nerve stimulation system, according to aspects of the present disclosure.

The support arms 400 may be manufactured from a variety of biocompatible materials, including, by way of non-limiting example, superelastic or shape memory alloys such as Nitinol, and other metals such as titanium, Elgiloy®, and/or stainless steel. The support arms 400 could also be made of, by way of non-limiting example, polymers or polymer composites that include thermoplastics, resins, carbon fiber, and like materials. In the illustrated embodiment, the support arms 400 are secured to a deployment support member 430, which may be secured to an interior component of the body 220 (as shown in FIGS. 8 and 9) in a variety of ways, including by way of non-limiting example, adhesively bonded, laser welded, mechanically coupled, or integrally formed. In alternate embodiments, the support arms 400 may be secured to an interior component of the body 220 directly, thereby eliminating the need for a deployment support member 430.

Figure 2D:
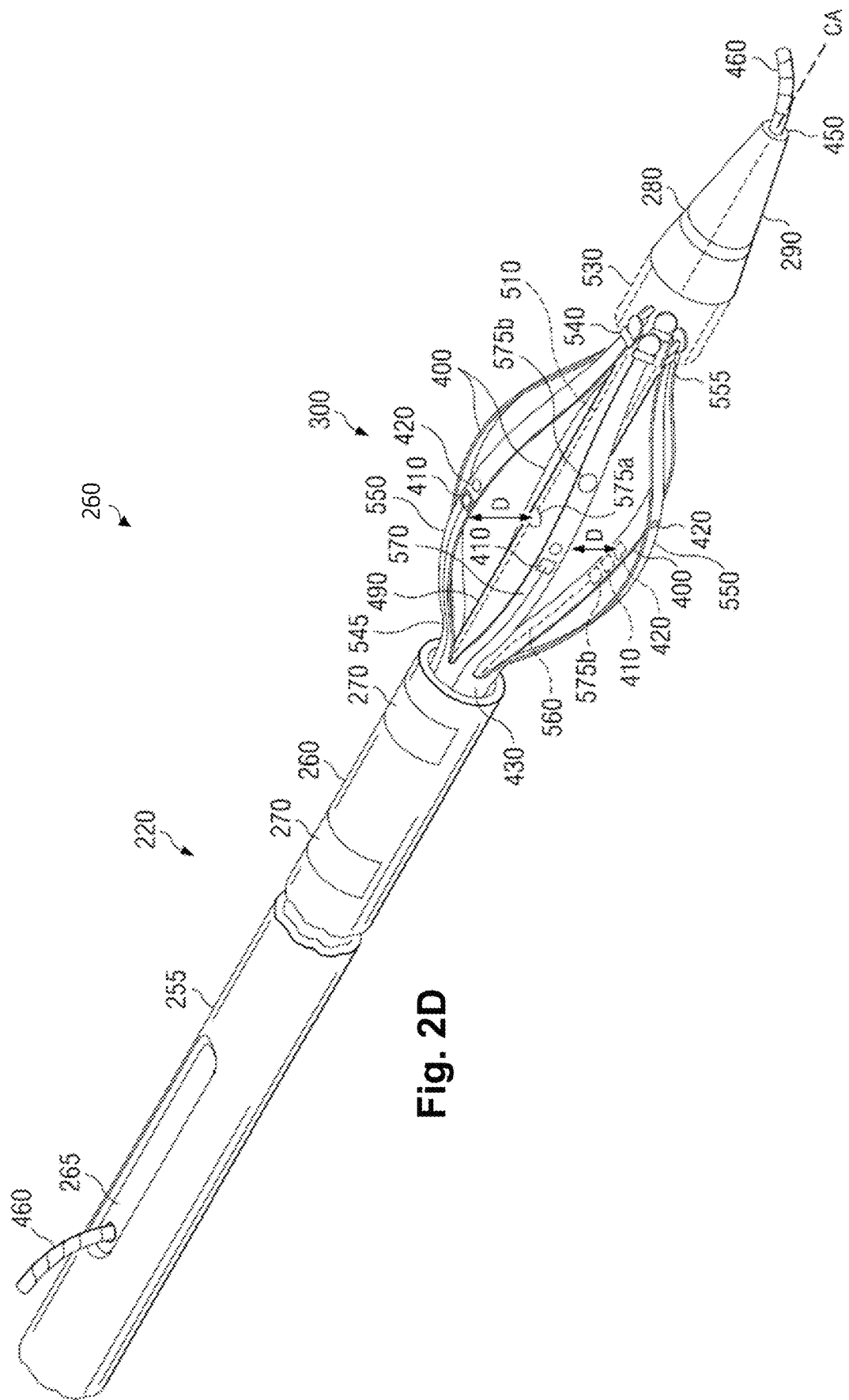
FIG. 2D is a schematic diagram of a nerve stimulation device 260 in an expanded state, according to aspects of the present disclosure.

FIG. 2D is a schematic diagram of a distal portion 260 of a nerve stimulation device in an expanded state, according to aspects of the present disclosure. The endovascular device described previously with reference to FIG. 1, FIG. 2A, FIG. 2B, and/or FIG. 2C may include features similar to those of the nerve stimulation device shown in FIG. 2D.

FIG. 2D illustrates the thermal basket catheter in an expanded condition according to one embodiment of the present disclosure wherein the distal tip 290 has been moved axially away from the remainder of the distal portion and at least one of the support arms 400 has expanded outwardly. The support arms 400 may be manufactured in any of a variety of shapes, including by way of non-limiting example, arcuate shapes, bell shapes, smooth shapes, and step-transition shapes. The support arms include a proximal section 545, a medial section 550, and a distal section 555. The proximal section 545 may be capable of coupling the expandable structure 300 to the body 220 or the inner body 490. The medial section 550 is configured to be positioned proximate to or in contact with a vessel luminal wall. The distal section 555 couples each arm 400 to a support arm retainer 540 positioned on an exterior of the inner body 490.

The transverse or cross-sectional profile of the support arms 400 may be manufactured in any of a variety of shapes, including oblong, ovoid, and round. In some embodiments, the cross-sectional profile of the support arm includes rounded or atraumatic edges to minimize damage to an artery or a tubular structure through which the expandable structure 300 may travel.

In one embodiment, the proximal sections 545 of the support arms 400 may be coupled to the deployment support member 430 using an adhesive, such as, by way of non-limiting example, Loctite 3311 adhesive or any other biologically compatible adhesive. In an alternate embodiment, the expandable structure 300 may be manufactured by laser cutting or forming the at least one support arm 400 from a substrate. For example, any number of support arms 400 may be laser cut within a Nitinol tube or cylinder, thereby providing a slotted expandable body. The support arms 400 may be fabricated from a self-expanding material biased such that the medial section 550 expands into contact with the vessel luminal wall upon expanding the endovascular device 102. In some embodiments, the one or more support arms 400 may be formed in a deployed state as shown in FIG. 2D wherein at least one support arm 400 is flared outwardly from the longitudinal axis CA of the endovascular device 102.

In the illustrated embodiment, the guidewire lumen 510, capable of receiving the guidewire 460 therein, longitudinally traverses the expandable structure 300. The guidewire lumen 510 is in communication with the guidewire port 450 on the distal portion 260 and guidewire exit slot 265 located on the elongated body 220. In an alternate embodiment, the guidewire lumen 510 may be in communication with the guidewire port 450 on the distal tip 290 and/or a proximal port located on a handle of the device. In the illustrated embodiment, a retainer sleeve 530 is positioned over a distal section of the support arms 400 to provide a transition between the distal tip 290 and the support arms 400. As shown, the retainer sleeve 530 is positioned over the support arm retainers 540, thereby preventing the support arm retainers 540 from contacting the vessel wall and causing trauma to the vessel luminal wall, damaging the support arm retainers 540, or both. Other embodiments may lack a retainer sleeve.

During manufacture, the at least one support arm 400 is formed to assume a deployed position in a relaxed state as shown in FIG. 2D, wherein the medial section 550 of the support arm 400 is flared outwardly a distance D from the longitudinal axis CA of the device 260. The application of force to the apex of the medial section 550 of the support arm 400 decreases the curvature of the support arm 400 resulting in a corresponding decrease in the distance D.

The at least one electrode 410 may be positioned on the medial section 550 of at least one of the support arms 400, thereby enabling the electrode 410 the sensor 420 to contact or approximate the vessel luminal wall. At least one electrode cable 560 connects each electrode 410 to an interface and/or a thermal electric field generator.

The at least one sensor 420 may be positioned on the medial section 550 of at least one of the support arms 400, thereby enabling the sensor to contact or approximate the vessel luminal wall. At least one sensor cable connects each sensor 420 to a sensor coupler and/or the interface.

The expandable structure 300 may include at least one ancillary sensor 575 thereon. As shown in FIG. 2D, the ancillary sensor 575a may be positioned on an exterior surface of the inner body 490. In the alternative, at least one ancillary sensor 575b may be positioned on at least one support arm 400. Exemplary ancillary sensors 575 include, without limitation, ultrasonic sensors, flow sensors, thermal sensors, blood temperature sensors, electrical contact sensors, conductivity sensors, electromagnetic detectors, pressure sensors, chemical or hormonal sensors, pH sensors, and infrared sensors. For example, in one embodiment the ancillary sensor 575a may comprise a blood sensor positioned on the guidewire lumen 510 in the bloodstream as shown in FIG. 2D, thereby permitting the sensors 420 located on the support arms 400 to measure the vessel wall temperature while simultaneously the ancillary sensor 575a measures blood temperature within the vessel. In another embodiment, the ancillary sensor 575b may comprise a pressure sensor positioned on the support arm 400 proximate to the electrode 410 and/or encircling the electrode 410. The ancillary pressure sensor 575b may detect the pressure with which the proximate electrode 410 is contacting the vessel wall, thereby allowing the user to determine whether the electrode 410 is effectively contacting the vessel wall to ensure adequate energy transfer and neuromodulation.

In the embodiment illustrated in FIG. 2D, each support arm 400 is coupled by its distal section 555 to the inner body 490 using the support arm retainer 540, thereby permitting each support arm 400 to move independently relative to the inner body 490 and the other support arms 400. The ability of the support arms 400 to independently move within the support arm retainer 540 results in the creation of an expandable structure 300 offering flexibility, while permitting the support arms 400 to remain in contact with a vessel wall when traversing a tortuous or curved pathway, such as may be found in the renal arteries. More particularly, when the expandable structure 300 is in a non-deployed state, the ability of the support arms 400 to move independently of each other in an axial direction reduces shear resistance and results in a more flexible catheter than a catheter wherein the axial movement is coupled or otherwise restricted. In addition, when the expandable structure 300 is in a deployed and expanded state, the ability of the support arms 400 to move independently facilitates contact of each of the support arms 400 with the vessel wall without applying excessive force thereto, thereby decreasing or eliminating the likelihood of injury to the vessel. Maximizing contact of each of the support arms 400 with the vessel wall in turn maximizes contact of sensors 420 with the vessel wall, which can be important in some embodiments for obtaining accurate sensor readings.

Referring again to FIG. 2D, the ability of support arms 400 to move independently with respect to the inner body 490 and the other support arms 400 results in the formation of a flexible expandable structure 300 capable of traversing tortuous vessel pathways. The support arms 400 of the expandable structure 300 may be manufactured in a variety of shapes, lengths, widths, and thickness to promote the flexibility of the individual support arms 400. A high degree of flexibility of the support arms helps to ensure the atraumatic deployment and movement of the expandable structure 300 within a vessel lumen or tubular structure. For example, in one embodiment the support arms 400 may have a length of about 5 mm to about 26 mm, and more specifically, a length of about 10 mm to about 16 mm. Similarly, the support arms 400 may be manufactured from a material having a thickness of about 0.0381 mm to about 0.1778 mm. More specifically, in one embodiment, the support arms 400 have a thickness of about 0.0635 mm to about 0.1143 mm. These ranges are provided for illustrative purposes only and are not intended to be limiting.

The distal portion 260 may include several radiopaque markers 270. The radiopaque markers 270 are spaced along the distal portion 260 at specific intervals from each other and at a specific distance from the distal tip 290. The radiopaque markers 270 may aid the user in visualizing the path and ultimate positioning of the catheter 210 within the vasculature of the patient. In addition, the radiopaque markers 270 may provide a fixed reference point for co-registration of various imaging modalities and treatments, including by way of non-limiting example, external imaging including angiography and fluoroscopy, imaging by the imaging apparatus 280, and thermal neuromodulation by the expandable structure 300. Other embodiments may lack radiopaque markers.

Figure 3:
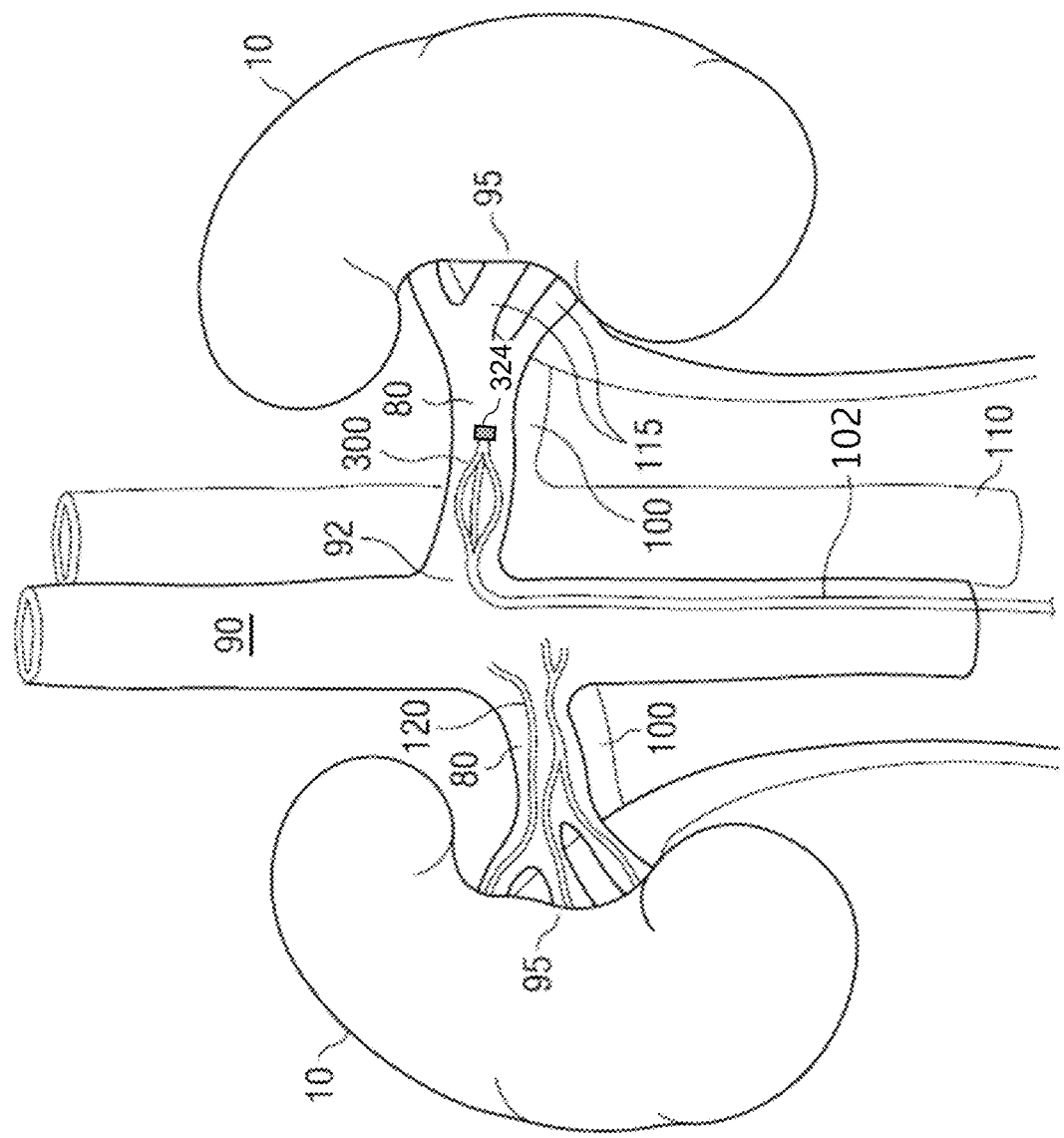
FIG. 3 is a diagrammatic view of a region of a patient anatomy, according to aspects of the present disclosure.

FIG. 3 is a diagrammatic view of a region of a patient anatomy, according to aspects of the present disclosure. FIG. 3 illustrates a portion of the endovascular device 102 in an expanded condition positioned within the human renal anatomy. The human renal anatomy includes kidneys 10 that are supplied with oxygenated blood by right and left renal arteries 80, which branch off an abdominal aorta 90 at the renal ostia 92 to enter the hilum 95 of the kidney 10. The abdominal aorta 90 connects the renal arteries 80 to the heart. Deoxygenated blood flows from the kidneys 10 to the heart via renal veins 100 and an inferior vena cava 110. Specifically, the endovascular device 102 is shown extending through the abdominal aorta and into the left renal artery 80. In alternate embodiments, the thermal basket catheter may be sized and configured to travel through the inferior renal vessels 115 as well.

Left and right renal plexi or nerves 120 surround the left and right renal arteries 80, respectively. Although renal nerves 120 are shown around the right renal artery, additionally nerves 120 are additionally present around the left renal artery but not pictured in FIG. 3 for pedagogical purposes. Anatomically, the renal nerve 120 forms one or more plexi within the adventitial tissue surrounding the renal artery 80. For the purpose of this disclosure, the renal nerve is defined as any individual nerve or plexus of nerves and ganglia that conducts a nerve signal to and/or from the kidney 10 and is anatomically located on the surface of the renal artery 80, parts of the abdominal aorta 90 where the renal artery 80 branches off the aorta 90, and/or on inferior branches of the renal artery 80. Nerve fibers contributing to the plexi 120 arise from the celiac ganglion, the lowest splanchnic nerve, the corticorenal ganglion, and the aortic plexus. The renal nerves 120 extend in intimate association with the respective renal arteries into the substance of the respective kidneys 10. The nerves are distributed with branches of the renal artery to vessels of the kidney 10, the glomeruli, and the tubules. Each renal nerve 120 generally enters each respective kidney 10 in the area of the hilum 95 of the kidney, but may enter in any location where a renal artery 80 or branch of the renal artery enters the kidney.

Proper renal function is essential to maintenance of cardiovascular homeostasis so as to avoid hypertensive conditions. Excretion of sodium is key to maintaining appropriate extracellular fluid 934 volume and blood volume, and ultimately controlling the effects of these volumes on arterial pressure. Under steady-state conditions, arterial pressure rises to that pressure level which results in a balance between urinary output and water and sodium intake. If abnormal kidney function causes excessive renal sodium and water retention, as occurs with sympathetic overstimulation of the kidneys through the renal nerves 120, arterial pressure will increase to a level to maintain sodium output equal to intake. In hypertensive patients, the balance between sodium intake and output is achieved at the expense of an elevated arterial pressure in part as a result of the sympathetic stimulation of the kidneys through the renal nerves 120. Thermal neuromodulation of the renal nerves 120 may help alleviate the symptoms and sequelae of hypertension by blocking or suppressing the efferent and afferent sympathetic activity of the kidneys 10.

Figure 4:
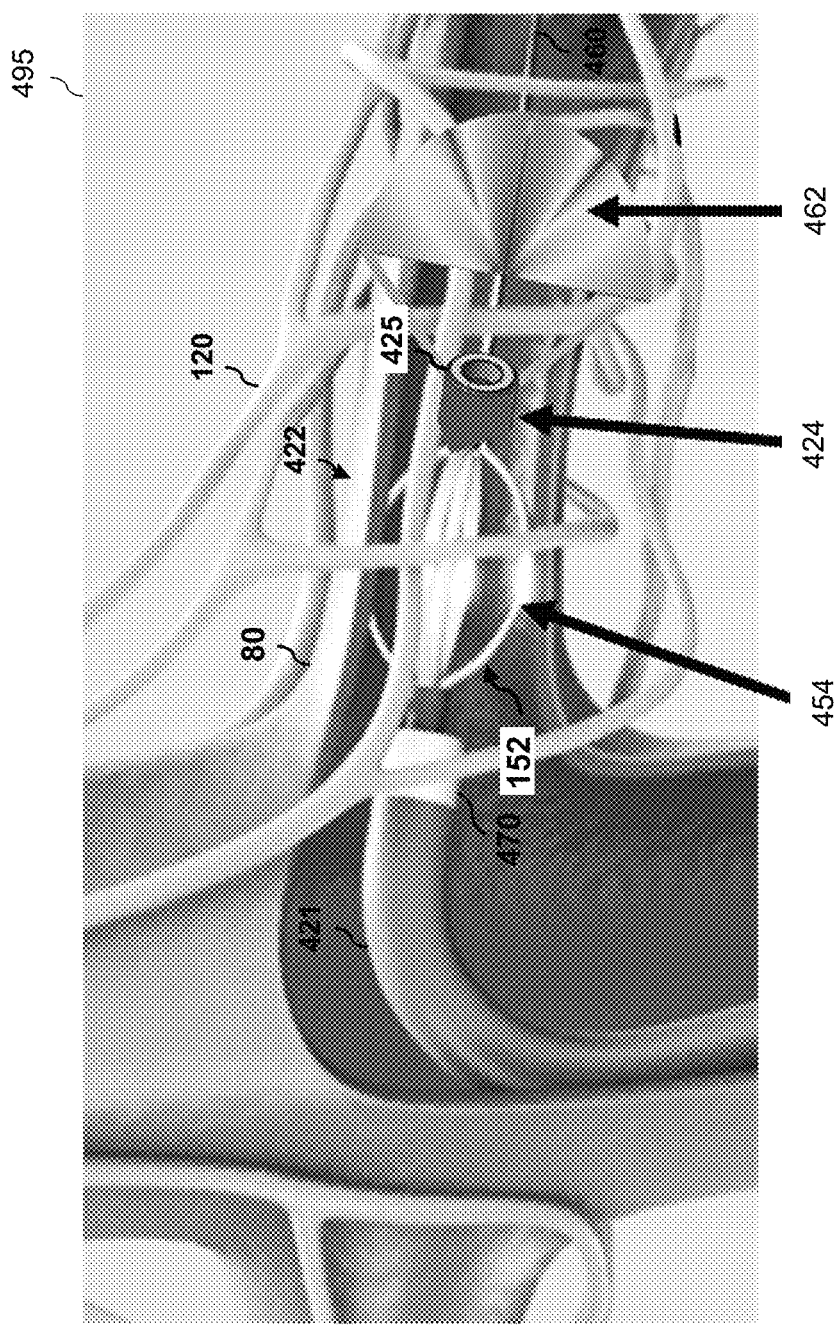
FIG. 4 is a diagrammatic view of a region of a patient anatomy, according to aspects of the present disclosure.

FIG. 4 is a diagrammatic view of a region of a patient anatomy, according to aspects of the present disclosure. FIG. 4 includes a diagrammatic extraluminal image 495 of a section of the renal artery 80. The extraluminal image 495 may be an extraluminal image obtained by an extraluminal imaging system or may be an image model or other type of image.

As shown in FIG. 4, a nerve stimulation/ablation device 422 may be positioned within the renal artery 80. In some embodiments, the nerve stimulation/ablation device 422 may be similar to, or share features with, any of the devices described in the present disclosure. For example, the device 422 may be similar to the device 102 (FIG. 2A and FIG. 3) and/or the device 260 (FIG. 2B, FIG. 2C, and FIG. 2D).

As shown in FIG. 4, the renal artery 80 may include multiple nerves 120, as previously described. These nerves 120 may include afferent nerves and efferent nerves, as will be described in more detail hereafter.

The device 422 includes a flexible elongate member 421. In some embodiments, a guide catheter 470 may be positioned at a distal end of the flexible elongate member 421. The guide catheter 470 may be configured to obtain various measurements. For example, the guide catheter 470 may include a pressure sensor. The pressure sensor of the guide catheter 470 may receive pressure measurements of the blood at the location of the guide catheter 470. In some embodiments, the guide catheter may perform additional measurements.

The device 422 may additionally include the nerve stimulation assembly 152 described with reference to FIG. 2A. As shown, the nerve stimulation assembly 152 may include one or more electrodes 454. The electrodes 454 of the nerve stimulation assembly 152 may be similar to the electrodes 152 of FIG. 1 and FIG. 2A. The electrodes 152 may also be similar to the electrodes 410 of FIG. 2C and/or FIG. 2D. In some embodiments, the nerve stimulation assembly 152 may include sensors positioned proximate to the electrodes 454, similar to the sensors 420 described previously with reference to FIGS. 2C and 2D.

As shown in FIG. 4, the nerve stimulation assembly 152 of the device 422 may be in an expanded position. In this way, the electrodes 454 of the assembly 152 may be in contact with, or close to, the inner walls of the renal artery 80.

The device 422 additionally includes the flow sensor 424. The flow sensor 424 may be similar to the flow sensor 124 described with reference to FIG. 1 and FIG. 2A. In the embodiment shown, the flow sensor 424 may be positioned at a distal end of the device 422. The flow sensor 424 may be positioned at another location. In the example shown, the flow sensor 424 is positioned at a distal end of the nerve stimulation assembly 152 but may be positioned at another location. As described, the flow sensor 424 may acquire data relating to blood flow within the renal artery 80. This acquired data may be represented by the data 462 shown in FIG. 4.

The data 462 illustrates blood velocity measurements acquired by the flow sensor 424. As shown, the data 462 may be representative of the velocity of blood in the renal artery 80 directly in front (distally) of the flow sensor 424. In some embodiments, the data 462 may include blood velocity measurements at multiple locations within the renal artery 80. For example, the data 462 may include blood velocity measurements corresponding to one or more three-dimensional locations in the renal artery 80. As an example, locations within the renal artery 80 may be defined by both a position along the artery in a longitudinal direction and a position within a cross-sectional shape of the artery at that longitudinal position. In this way, with the flow sensor 424 at one particular location within the artery 80, the sensor 424 may acquire blood velocity information relating to multiple locations of various distances from the flow sensor 424 and various positions within the artery 80. As shown in FIG. 4, this blood velocity data may be displayed to a user in any way. For example, blood velocity data 462 may include various illustrative displays. In some embodiments, a processor of the system 100 may assign a blood velocity value with a color. A velocity map may then be constructed include different colors at corresponding locations within the artery 80 of various blood velocity measurements. In other embodiments, blood velocity data may be displayed as numerical values associated with a three-dimensional or two-dimensional coordinate identifying a location within the artery 80. In some embodiments, a processor circuit of the system 100 may average or otherwise combine multiple blood velocity measurements and display one or more values to the user associated with a particular region of the artery 80. Other ways of displaying blood velocity data 462 are also contemplated.

The blood velocity data 462 may be acquired by a blood velocity sensor 425 shown in FIG. 4. As described with reference to FIG. 2A, in an embodiment in which the endovascular device 422 is configured to be positioned around a guidewire (e.g., the guidewire 460 described hereafter) within the lumen, the flow sensor 425 may be a ring-shaped ultrasound transducer, or multiple ultrasound transducers arranged in a ring shape, positioned on a distal surface of the flow sensor 425.

Additionally shown in the image 495 in FIG. 4 is a guidewire 460. The guidewire 460 may be the same guidewire described with reference to FIG. 2D.

Figure 5:
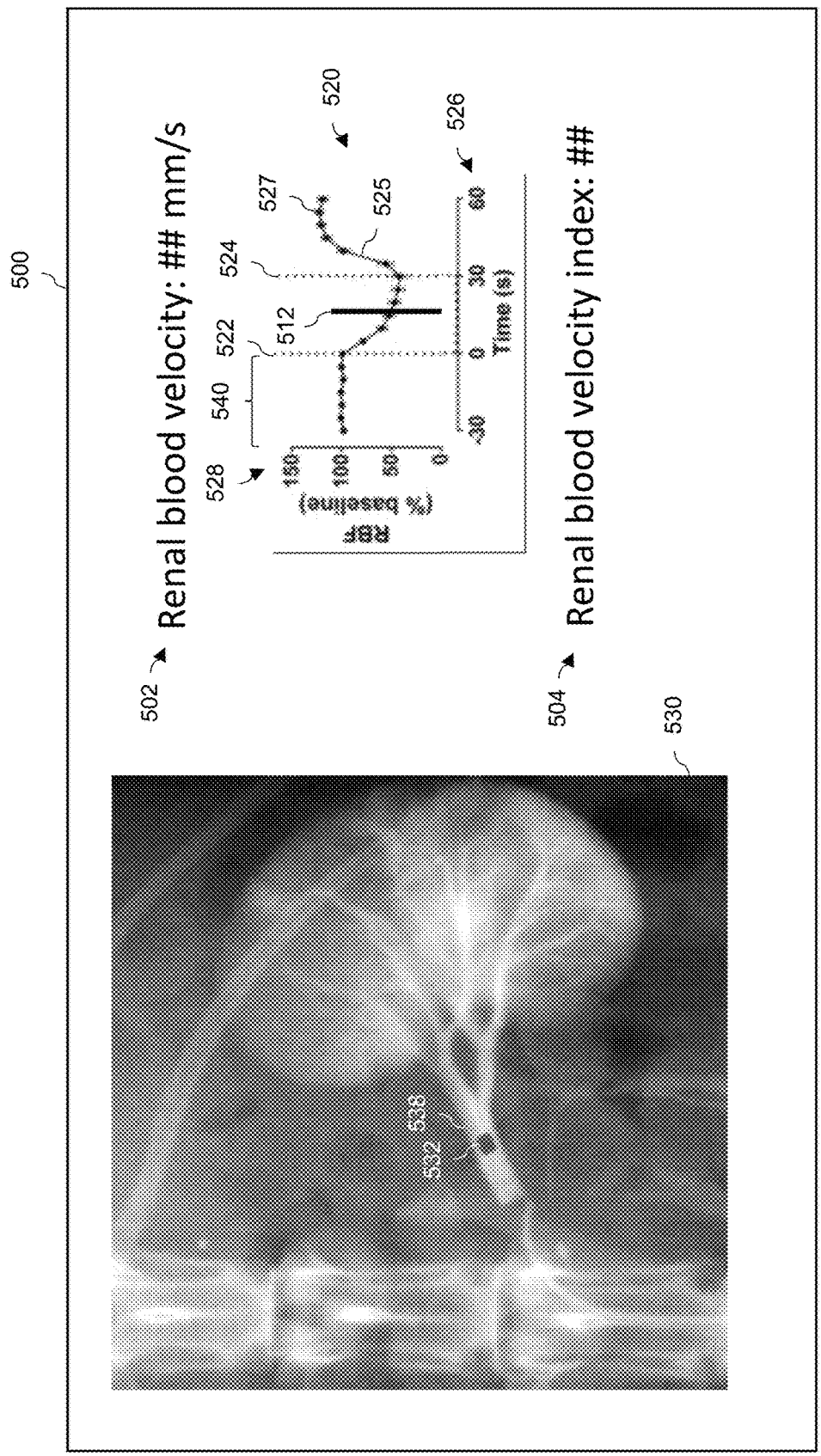
FIG. 5 is a diagrammatic view of a graphical user interface associated with a nerve stimulation procedure, according to aspects of the present disclosure.

FIG. 5 is a diagrammatic view of a graphical user interface 500 associated with a nerve stimulation procedure, according to aspects of the present disclosure. In some embodiments, the graphical user interface 500 may be displayed to a user of the system after a nerve stimulation procedure is complete. The graphical user interface 500 displayed to a user may include an extraluminal image 530 including a view of an intravascular device 532, as well as a renal blood velocity measurement 502, a renal blood flow plot 520, and a renal blood velocity index 504.

The extraluminal image 530 may be an x-ray image obtained with or without contrast during a nerve stimulation procedure. In an example, the extraluminal image 530 may include a view of the renal artery 538 of the patient. In some embodiments, the extraluminal image 530 may include a depiction of the intravascular device 532. The intravascular device 532 may be a nerve stimulation and blood flow measurement device within the renal artery 538 of a patient. For example, the intravascular device 532 may be similar to the devices described previously with reference to FIGS. 2A-4. During a nerve stimulation procedure, the user of the system 100 may position the device 532 within the renal artery 538. The user may direct an extraluminal imaging system to obtain extraluminal images of the patient anatomy including a view of the renal artery. In this way, the user may ensure that the device 532 is correctly positioned within the renal artery 538.

After the device 532 is positioned within the renal artery 538, the user of the system 100 may instruct the system, by a user input, to begin acquiring blood velocity measurements. The blood velocity measurements obtained may be displayed to a user in any suitable way, as described with reference to FIG. 4. In one embodiment, as shown in FIG. 5, the blood flow measurement may be displayed to a user as the renal blood velocity value 502. This value 502 may reflect the blood flow in real time as measured by the flow sensor of the device 532. For example, the renal blood velocity value 502 may be continuously updated to reflect the blood velocity within the vessel at the flow sensor at consecutive times.

The user interface 500 may additionally include the plot 520. The plot 520 may display for a user the blood flow measurements obtained by the device 532 over a time period, so as to include historical data and/or current data updated in real time. The blood flow measurements shown in FIG. 5 may relate to blood velocity within a renal artery of a patient and may be averaged for every heart beat of the patient or averaged over multiple heart beats.

For example, the plot 520 may include a time axis 526 and a renal blood flow axis 528. The time axis 526 may illustrate elapsed time of a procedure. In one embodiment, the leftmost region of the time axis 526 may represent the first measured time of a procedure or the time at which a timer was started. The time shown by the axis 526 may be indicative of the time of day at which various blood velocity measurements were acquired or it may reflect a timer starting from zero. In some examples, as shown in FIG. 5, a time of zero may correspond to the time at which a stimulation signal was begun by the device 532. The time axis 526 may be shifted in any suitable way as well such the time of zero may correspond to another time of the procedure. In some embodiments, the time axis 526 may reflect only a portion of the procedure. For example, the time axis 526 may be shifted automatically by the processor circuit of the system 100 or a user to show the time corresponding to a nerve stimulation, as shown in FIG. 5. In some embodiments, the time axis 526 may be continuously shifted so as to display the time of the most recent blood velocity measurement and an arbitrary number of previous times as well. In this way, the time axis 526 may be updated so as to move as time goes by and additional renal blood velocity measurements are added to the plot.

The renal blood flow axis 528 may provide a visual illustration of blood flow measurements. For example, it may provide a reference such that locations of blood flow measurements within the plot 520 may indicate the corresponding value. The range of the renal blood flow axis 528 may be automatically adjusted by the processor circuit of the system 100 or may be adjusted by a user.

The plot 520 may additionally include multiple blood velocity data points 527. Each blood velocity data point 527 may include a two-coordinate data point including a renal blood velocity measurement value and a time value. The blood velocity measurement value may correspond to the blood velocity measured by the flow sensor of the device 532. The time value may correspond to the time along the time axis 526 at which the associated blood velocity measurement was acquired. In this way, the data points 527 may be positioned within the plot 520 so as to correspond to their renal blood velocity value and their time value. The plot 520 may additionally include a line 525 connecting the blood velocity data points 527.

In some embodiments, the plot 520 may include a dotted line 522. The line 522 of the plot 520 may be a vertical line corresponding to a time measurement. In one embodiment, the line 522 may correspond to the time at which the device 532 began to stimulate the renal nerves. The line 522 may be any suitable visual element which identifies the time at which renal nerve stimulation began. For example, the line 522 may alternatively be any visual element including any visual or graphical characteristics. For example, the line 522 may include any geometric or non-geometric shape or any pattern, color, alphanumeric text, or any other visual representation.

The plot 520 may include an additional dotted line 524. The line 524 of the plot 520 may be a vertical line corresponding to a time measurement. In one embodiment, the line 524 may correspond to the time at which the device 532 stopped stimulating the renal nerves. Like the line 522, the line 524 may be any suitable visual element.

By providing the lines 522 and 524 within the plot 520, the system 100 may identify the times at which the device 532 was stimulating the renal nerves. In some embodiments, the region between the lines 522 and 524 may be further visually differentiated from other regions of plot 520. For example, the region between the lines 522 and 524 may be highlighted or overlaid with any suitable color or pattern or differentiated in another way by an additional indicator or by any other way.

In some embodiments, a marker 512 may additionally be included within the plot 520. The marker 512 may identify for a user a location within the plot 520 associated with the renal blood velocity value 502. As previously described, the blood velocity value 502 may correspond to a blood velocity measurement most recently acquired by the device 532. In other embodiments, the blood velocity value 502 may correspond to the marker 512. In some embodiments, the user of the system 100 may, by a user input, move the location of the marker 512. For example, the user of the system 100 may move the marker 512 to another location along the line 525 of the plot 520. In response to this move, the processor circuit of the system 100 may identify the blood velocity value 502 associated with the new location (e.g., the time measurement closest to the new position of the marker 512) and display this value as the value 502.

In some embodiments, the processor of the system 100 may additionally be configured to calculate a renal blood velocity index 504. A renal blood velocity index may compare two or more renal blood velocity values to give the user of the system 100 a simplified metric of the degree of change in hemodynamic measurements (e.g., blood flow) in response to nerve stimulation. In some embodiments, the processor circuit of the system 100 may be configured to determine a renal blood velocity index for a region of the plot 520 displayed to a user. As an example, the calculation of a renal blood velocity index will be described with reference to the plot 520 shown in FIG. 5.

The processor circuit of the system 100 may calculate the renal blood velocity index 504 in any way. As one example, the processor circuit may be configured to determine two values. The processor circuit may determine a baseline value of the renal blood flow. This baseline value may correspond to an average blood flow value before nerve stimulation begins. For example, as shown in FIG. 5, the baseline value may correspond to an average of all renal blood velocity values with a time coordinate within the region 540 shown. The processor circuit may alternatively determine the baseline value as a maximum or minimum of the values of the region 540 or may determine the baseline value in any other way. The baseline value may be defined, for purposes of the present disclosure, as the variable, $X_{base}$. The processor circuit of the system 100 may also determine a value of renal blood flow associated with nerve stimulation. This value may be referred to as the stimulation value and defined as the variable $X_{stim}$. The stimulation value ($X_{stim}$) may be a minimum value of the renal blood velocity values obtained while the renal nerves were stimulated. For example, as shown in FIG. 5, the stimulation value may be the minimum value in the region between the lines 522 and 524. In other embodiments, the stimulation value may alternatively be a maximum or an average of these values. In some embodiments, as will be described in more detail hereafter, the processor circuit may determine a group of one or more adjacent blood velocity values within the region between the lines 522 and 524 of the same or similar velocity value. The stimulation value may be an average of these selected values of the same or similar velocity. In this way, the stimulation value may reflect an average of blood velocity values after the patient vasculature system have stabilized.

The renal blood velocity index value may compare the baseline value (Xbase) with the stimulation value (Xstim) by providing a single value to the user of the system 100. The processor circuit of the system may be configured to determine the index value in any suitable way. In one example, an index may be a ratio resulting from dividing the two values. Such a calculation may be shown by Equation 1 below:

$$\text{Index} = X_{stim}/X_{base} \qquad \text{Equation 1:}$$

In another example, an index may be calculated according to Equation 2 below:

$$\text{Index} = (X_{stim} - X_{base})/X_{base} \qquad \text{Equation 2:}$$

Each of these equations are given as exemplary methods of calculating a renal blood velocity index value. Additional equations or methods are contemplated.

In other embodiments, the user of the system 100 may input to the processor circuit of the system a region of the plot 520 upon which to base a blood velocity index value calculation. For example, the user may select a region of the plot 520 and the system 100 may determine a velocity index value based on only the selected region. For example, a region of the plot 520 may be selected by the user which includes a different minimum value than the value selected as the stimulation value. With a different minimum selected as the stimulation value, the processor circuit of the system 100 may determine a different number for the renal blood velocity index. This may allow a user of the system to account for perceived errors in data acquisition, outliers in data or any other anomalies which a user of the system may wish to correct.

The methods of the disclosure presented may assist a physician in determining whether a patient under diagnosis will respond well to a renal denervation procedure. A renal denervation procedure includes severing or otherwise impairing the renal nerves from performing their function. Specifically, one cause of hypertension within patients may be renal nerves functioning improperly. For example, efferent nerves receive signals from the central nervous system of a patient exhibiting hypertension may cause the renal artery to contract, thereby unnecessarily increasing blood pressure within the body. By preventing these efferent nerves from communicating with the central nervous system, the renal artery may not contract and may reduce blood pressure within the patient. The process of severing or disabling renal nerves may be referred to as renal denervation and is an effective method of treating high blood pressure. However, in some patients, renal denervation is not effective. This may be because the renal nerves of a patient already to not respond to stimulation from the central nervous system. If renal nerves do not respond to stimulation from the central nervous system, those renal nerves will likely not reduce hypertension if disabled. The present invention discloses an improved method of identifying both if renal nerves respond to stimulation and, by extension, if that particular patient, or particular renal nerves within a patient, should be ablated by a denervation procedure.

The plot 520 shown in FIG. 5 may illustrate data associated with a patient or nerve which would respond positively to a renal denervation procedure. As an exemplary stimulation procedure, the user of the system 100 may position the intravascular device 532 within the renal artery 538. After the device 532 is properly positioned, the device 532 may begin to continuously acquire renal blood velocity measurements. As previously described, these blood velocity measurements may be plotted within the plot 520 continuously or as they are acquired. As renal blood velocity measurements are made by the device 532, the user of the system 100 may instruct the system to being a stimulation procedures. The system 100 may then direct the device 532 to stimulate the renal nerves by discharging various electrical pulses or waves of a given voltage and/or frequency. When the device 532 begins stimulating the surrounding environment (e.g., the renal artery 80), the processor circuit of the system 100 may display the line 522 within the plot 520 at the correct location in time. As the device 532 continues to output the electrical pulse, the blood flow velocity measurements as also determined by the device 532 may begin to decrease, as shown in the plot 520. The user of the system or the processor of the system may then direct the device 532 to stop stimulating the renal nerves. The processor circuit of the system 100 may then display the line 524 at the point in time corresponding to when the renal nerve stimulation ended. In response to ending stimulation, the blood flow, as shown on the plot 520 after the line 524 may increase again and settle near the original baseline value, or the value of blood velocity before stimulation.

Because the renal blood flow was affected by the stimulation, as shown by the drop in blood velocity between the lines 522 and 524 (corresponding to nerve stimulation), a user of the system 100 may determine that ablation of the nerves just stimulated would effectively reduce hypertension in the patient. In some embodiments, little to no change in the renal blood velocity of the patient may indicate that the patient would not respond to an ablation procedure at that location. Stated differently, if little to no change in blood velocity is observed during a stimulation procedure, the nerve under stimulation would likely not lead to reduced blood pressure if ablated.

As previously described, the blood velocity index may serve as an additional indicator of whether ablation of a nerve would lead to decreased blood pressure. The index provides the user with a simplified quantification of the degree to which the blood velocity was affected by nerve stimulation.

Renal nerve stimulation, and subsequently renal denervation, affects many hemodynamic parameters. For example, nerve stimulation as described herein affects blood pressure. In a similar way as described in the present disclosure, the blood pressure of a patient may increase in response to a nerve stimulation procedure. However, a measurement in blood flow may be more drastically affected by renal nerve stimulation. This may be because blood pressure is measured at any suitable location within, or outside the blood vessels of a patient and may be affected by a number of factors in addition to renal nerve stimulation. Blood velocity measurements, on the other hand, particularly when measured within the renal artery locally are more dramatically affected by renal nerve stimulation and are less affected by other factors. As a result, a physician may more easily determine whether a renal nerve, or a patient in general, is a good candidate for (e.g., will respond well to or see a decrease in blood pressure as a result of) renal denervation. Advantageously. In this way, measuring and quantifying renal blood velocity within the renal artery specifically may advantageously provide a more accurate view of the effect of renal nerve stimulation leading to more effective renal denervation procedures and minimizing unnecessary exposure to renal denervation.

Figure 6:
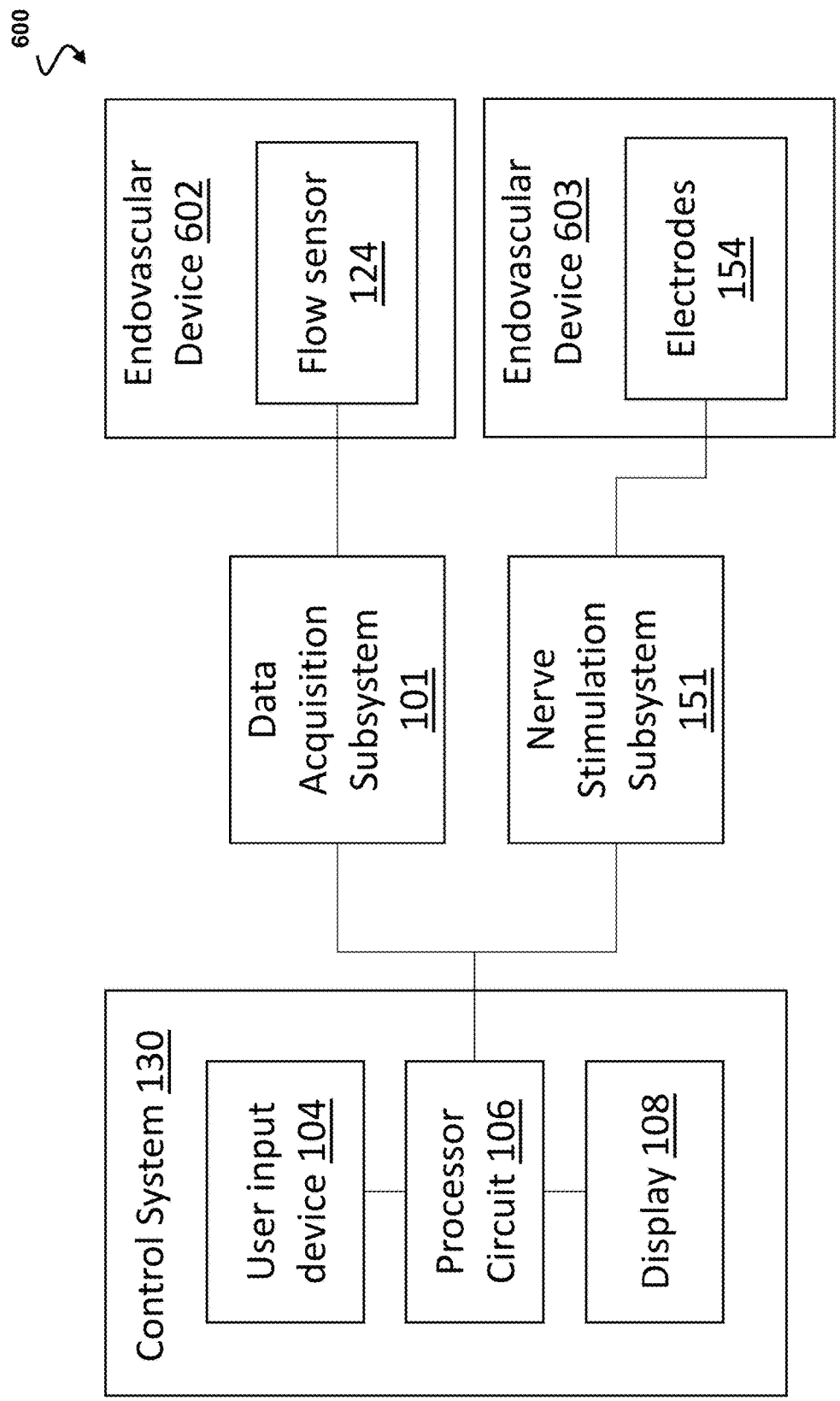
FIG. 6 is a schematic diagram of a data acquisition and nerve stimulation system, according to aspects of the present disclosure.

FIG. 6 is a schematic diagram of a data acquisition and nerve stimulation system 600, according to aspects of the present disclosure. The system 600 may be similar to the data acquisition and nerve stimulation system 100 described with reference to FIG. 1. Specifically, the system 600 may include the control system 130, the data acquisition subsystem 101 and the nerve stimulation subsystem 151.

The data acquisition and nerve stimulation system 600 may differ from the system described with reference to FIGS. 1-5 in a number of ways. In one aspect, the data acquisition subsystem 101 may be in communication with a separate device from the nerve stimulation subsystem 151. Specifically, as shown in FIG. 6, the flow sensor 124 may be an element of an endovascular device 602. The endovascular device 602 may be in communication with the data acquisition subsystem 101. Similarly, the electrodes 154 may be an element of an endovascular device 603 and the endovascular device 603 may be in communication with the nerve stimulation subsystem 151.

As explained above, the system 600 may include two devices, a device 602 and a device 603 which may be simultaneously positioned within the renal artery of a patient. The data acquisition and nerve stimulation system 600 may perform any of the same methods, functions, and/or procedures as described with reference to FIGS. 1-5. Specifically, the system 600 may be configured to acquire renal blood velocity data by the endovascular device 602. The system 600 may additionally be configured to stimulate renal nerves by the endovascular device 603. The system 600 may assist a physician in determining whether a patient or a particular nerve will likely respond positively to a renal denervation procedure, as described with reference to FIGS. 1-5.

Figure 7:
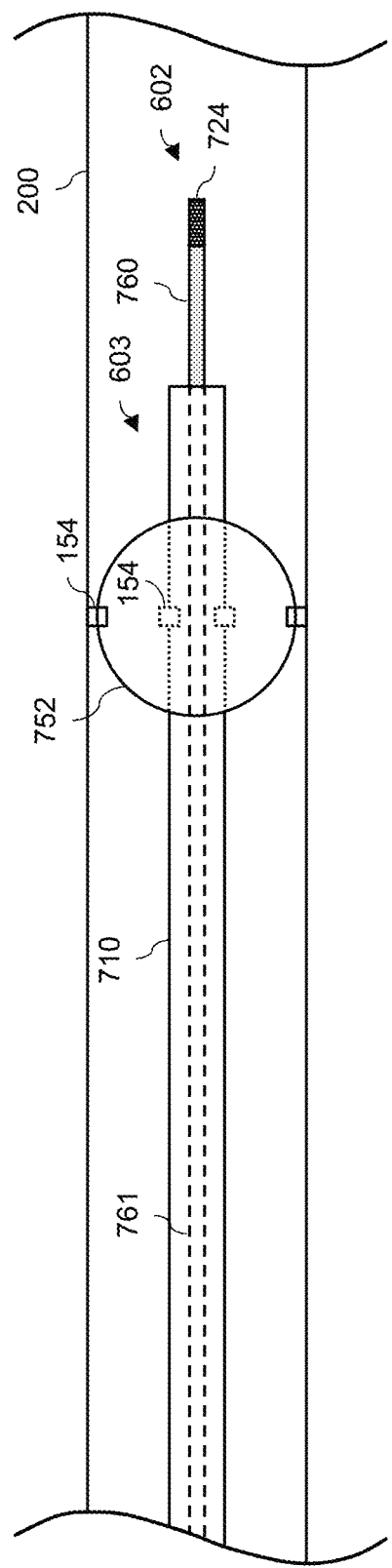
FIG. 7 is a schematic diagram of a blood flow sensing device and a nerve stimulation device, according to aspects of the present disclosure.

FIG. 7 is a schematic diagram of a blood flow sensing device 602 and a nerve stimulation device 603, according to aspects of the present disclosure. The device 602 and/or the device 603 may share any of the features of the device 102 (FIG. 2A) described previously. For example, like the device 102 shown in FIG. 2A, the device 602 and the device 603 may be configured to be positioned within the blood vessel 200 of a patient.

In some embodiments, the nerve stimulation device 603 may include a flexible elongate member 710, and a nerve stimulation assembly 752. The flexible elongate member 710 may be substantially similar to the flexible elongate member 210 described with reference to FIG. 2A. The nerve stimulation assembly 752 may also be substantially similar to the nerve stimulation assembly 152 of FIG. 2A. For example, the nerve stimulation assembly 752 may include one or more electrodes 154 which may be moved in a radial direction outward or inward between an expanded and compressed position.

The endovascular device 602 shown in FIG. 7 may also include a flow sensor 724. The flow sensor 724 may be substantially similar to the flow sensor 124 described with reference to FIG. 2A. Specifically, the flow sensor 724 may be disposed at a distal tip of the device 602. In some embodiments, the flow sensor 724 may be disposed at a distal tip of a guidewire 760. The guidewire 760 may be a flexible elongate member configured to be positioned within a lumen of the device 603 as will be described in more detail hereafter. The flow sensor 724 may include an electronic component mounted within a housing. Flow data obtained by the endovascular device 602 may be transmitted to another system or subsystem (e.g., to the data acquisition subsystem 101 and/or the control system 130) via any suitable methods as described with reference to the flow sensor 124. In some embodiments, the flow sensor 724 may be a thermoelectric sensor.

In some embodiments, the device 603 may define an inner lumen 761. For example, the flexible elongate member 710 and the nerve stimulation assembly 752 may be manufactured in such a way to allow another device, such as a guidewire (e.g., the guidewire 760) to pass through the radial center of the device 603. In this way, during a nerve stimulation procedure, the user of the system 100 may first position the guidewire 760 within the vessel 200 of the patient. For example, the guidewire 760 may be positioned within the vessel 200 such that the distal flow sensor 724 is positioned within a renal artery. After the guidewire 760 is positioned within the vessel 200, the endovascular device 603 may be positioned around a proximal portion of the endovascular device 602 (e.g., the guidewire 760) and moved along the guidewire 760. In this way, the device 602 may guide the device 603 to the same position within the vessel 200.

In other embodiments, one of which will be described in more detail with reference to FIG. 8 hereafter, the endovascular devices 602 and 603 may be positioned within the vessel 200 in any other way.

FIG. 8 is a diagrammatic view of a region of a patient anatomy, according to aspects of the present disclosure. FIG. 8 includes a diagrammatic extraluminal image 800 of a section of the renal artery 80. The extraluminal image 800 may be an extraluminal image obtained with an extraluminal imaging device or may a be a modeled image or another type of image.

FIG. 8 illustrates an additional embodiment of a device including separate endovascular devices: one device for obtaining blood velocity data (e.g., an endovascular device 802) and one device for stimulating renal nerves (e.g., an endovascular device 803). In some embodiments, the devices 802 and 803 shown in FIG. 8 may be positioned within the renal artery 80. In some embodiments, the device 802 and 803 may be positioned within the artery 80 adjacent to one another.

As shown in FIG. 8, a flexible elongate member 821 may be positioned within the vessel 80. In some embodiments, the flexible elongate member 821 may define a central lumen in which the nerve stimulation device 803 and the flow sensing device 802 may be positioned. The flexible elongate member 821 may alternatively include multiple central lumens. For example, the flexible elongate member 821 may define two lumens extending longitudinally through the center of the flexible elongate member 821. Each device 802 and 803 may be positioned within these two lumens respectively.

As shown in FIG. 8, the endovascular device 803 may include the nerve stimulation assembly 524 with electrodes positioned at outer surfaces of one or more arms, as has been described previously. The endovascular device 802 may include a guidewire 824 and a flow sensing device 825. In some embodiments, the flow sensing device 825 may acquire blood velocity data 862. The flow sensing device 825 may be substantially similar to the flow sensing device 425 described with reference to FIG. 4. In some aspects, the flow sensor 825 of the device 802 may not be arranged in a ring shape. In some embodiments, the blood flow data 862 may be similar to the data 462 described with reference to FIG. 4. Specifically, the blood flow data 862 may correspond to the velocity of blood within the renal artery 80. The device 825 may acquire blood velocity information relating to multiple locations of various distances from the flow sensor 425 and various positions within the artery 80. As shown in FIG. 8, this blood velocity data may be displayed to a user in any way, including numeric values such as alphanumeric characters, or visual or graphic displays.

During some procedures, the flexible elongate member 821 may be positioned within the vessel at an initial phase of a nerve stimulation procedure. The endovascular device 802 and the endovascular device 803 may be inserted within the lumen or lumens of the flexible elongate member 821. In this way, the flexible elongate member 821 may guide the device 802 and/or 803 through the patient vasculature to the desired location within the renal artery 80.

In some embodiments, the flexible elongate member 821 may include a guide catheter. The guide catheter of the flexible elongate member 821 may be substantially similar to the guide catheter 470 described with reference to FIG. 4.

It is additionally noted that the flow sensing endovascular device 802 and/or the nerve stimulation device 803 may include any features of the devices previously described.

FIG. 9 is a schematic diagram of a data acquisition and nerve simulation system 900, according to aspects of the present disclosure. The system 900 may be similar to the data acquisition and nerve stimulation system 100 and or the system 600 previously described with reference to FIG. 1 and FIG. 6 respectively. Similar to these systems previously described, the system 900 may include the control system 130, the data acquisition subsystem 101 and the nerve stimulation subsystem 151.

The data acquisition and nerve stimulation system 900 may differ from the systems described previously. In one aspect, the data acquisition subsystem 101 and the nerve stimulation subsystem 151 may be in communication with an endovascular device 902. The endovascular device 902 may include the flow sensor 124 and electrodes 154, both described previously. The flow sensor 124 may acquire blood flow velocity data and the electrodes 154 may be elements of a nerve stimulation assembly of the endovascular device 902. The endovascular device 902 may additionally include a pressure sensor 924.

As shown in FIG. 9, in the embodiment shown, the data acquisition subsystem 101 may be in communication with the flow sensor 124 and the pressure sensor 924 of the endovascular device 902. The nerve stimulation system 151 may be in communication with the electrodes 154 of the endovascular device 902.

Figure 10A:
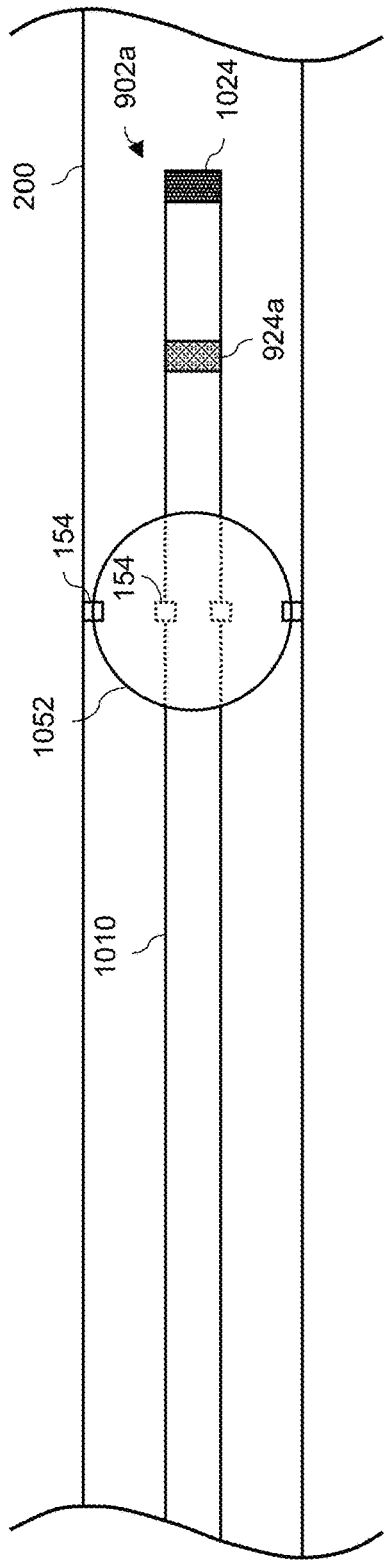
FIG. 10A is a schematic diagram of a blood flow and pressure sensing and nerve stimulation device, according to aspects of the present disclosure.

FIG. 10A is a schematic diagram of a blood flow and pressure sensing and nerve stimulation device 902a, according to aspects of the present disclosure. The device 902a may share any of the features of the device 102 (FIG. 2A) or devices 602 and 603 (FIG. 7) described previously. For example, like the previously described endovascular devices, the device 902a may be configured to be positioned within the blood vessel 200 of a patient.

As shown in FIG. 10A, the endovascular device 902a may include a flexible elongate member 1010, a nerve stimulation assembly 1052, a pressure sensing device 924a and a blood flow sensor 1024. The flexible elongate member 1010 may be substantially similar to the flexible elongate member 210 described with reference to FIG. 2A. The nerve stimulation assembly 1052 may be similar to the nerve stimulation assemblies previously described. For instance, the nerve stimulation assembly 1052 may be configured to move one or more electrodes 154, also shown in FIG. 10A, in a radial direction outward and inward between an expanded and unexpanded shape, as previously described. The flow sensor 1024 may be configured to obtain blood velocity measurements of blood at various locations distal of the sensor 1024 within the vessel 200. The flow sensor 1024 may be substantially similar to any of the flow sensors previously described.

In some embodiments, and as shown in FIG. 10A, the endovascular device 902a additionally includes the pressure sensor 924a. The pressure sensor 924a may be configured to acquire pressure measurements within the vessel 200.

The pressure sensor 924a may acquire pressure measurements in any suitable way. For example, the sensor 924a may periodically measure the pressure of fluid 934 (e.g., blood) at the location of the sensor 924a inside the vessel 200. In an example, the sensor 924a may be a capacitive pressure sensor, or in particular, a capacitive MEMS pressure sensor. In another example, the sensor 924a may be a piezo-resistive pressure sensor. In another example, the sensor 924a may be an optical pressure sensor. In some instances, the sensor 924a may include components similar or identical to those found in commercially available pressure monitoring elements such as OmniWire® pressure guide wire available from Philips, the PrimeWire PRESTIGE® pressure guide wire, the PrimeWire® pressure guide wire, and the ComboWire® XT pressure and flow guide wire, each available from Volcano Corporation. In some embodiments, blood pressure measurements may be used to identify and/or quantify pulse waves passing through the vessel.

As described with reference to the device 102 of FIG. 2A, the device 902a shown may be positioned around a guidewire in some embodiments. For example, the endovascular device 902a may define an inner lumen extending through the radial center of the device 902a in a longitudinal direction. This inner lumen may be sized and/or shaped to receive a guidewire. In this embodiment, the guidewire may be positioned within the vessel 200. Then the device 902a may be positioned around the guidewire such that the device 902a slides along the guidewire. As a result, the guidewire guides the device 902a to the desired position within a renal artery. In such an embodiment, the flow sensor 1024 may include a ring-shaped transducer or multiple transducers positioned in a ring around the center lumen and/or guidewire.

Figure 10B:
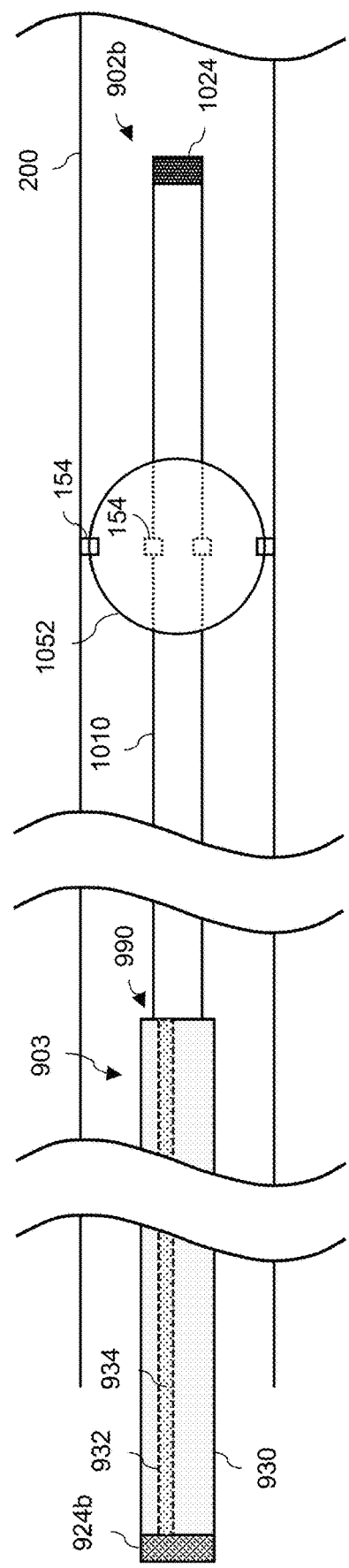
FIG. 10B is a schematic diagram of a blood flow sensing and nerve stimulation device and a blood pressure sensing device, according to aspects of the present disclosure.

FIG. 10B is a schematic diagram of a blood flow sensing and nerve stimulation device 902b and a blood pressure sensing device 903, according to aspects of the present disclosure. In some embodiments, as shown in FIG. 10B, various elements of the device 902 described with reference to FIG. 9 may be positioned on separate devices. As an example, a pressure sensing device 924b may be positioned on an endovascular device 903 while the blood flow sensor 1024 and the nerve stimulation assembly 1052 may be positioned on the endovascular device 902b.

The device 902b may share any of the features of the device 102 (FIG. 2A), the devices 602 and 603 (FIG. 7) or the device 902a (FIG. 10A) described previously. The device 903 may share features of any pressure sensing device described herein.

As shown in FIG. 10B, the endovascular device 902b may include the flexible elongate member 1010.

The endovascular device 903 additionally includes the pressure sensor 924b. The pressure sensor 924b may be configured to acquire pressure measurements within the vessel 200.

The pressure sensor 924b may acquire pressure measurements in any suitable way. For example, the pressure sensor 924b may share various features of the pressure sensor 924a described with reference to FIG. 10A.

In the embodiment shown in FIG. 10B, the pressure sensor 924b may be positioned at a location proximal to the nerve stimulation assembly 1052 and the flow sensor 1024. For example, in some embodiments, the pressure sensor 924b may be positioned outside the patient body during a nerve stimulation procedure. The pressure sensor 924 may be at a proximal end of a flexible elongate member 930. As shown in FIG. 10B, the flexible elongate member 930 may be inserted within the vessel 900 of the patient. The flexible elongate member 900 may be configured to define one or more inner lumens. As an example, the flexible elongate member 930 may define an inner lumen 932. In some embodiments, the proximal end of the lumen 932 may be terminated at the pressure sensor 924b. In this way, the pressure sensor 924b may be configured to monitor pressure measurements of a fluid 934 within the lumen 932. In some embodiments, blood from the vessel 200 may enter the lumen 932 at a distal end of the lumen 932. In this way, blood from the patient may fill the lumen 932 extending to the proximal end by the pressure sensor 924b. The pressure sensor 924b may then monitor the pressure of blood within the vessel 200. In some embodiments, the lumen 932 may be a closed chamber. For example, the device 903 may include a barrier at the distal end of the lumen 932 separating blood from the vessel 200 from a fluid 934 within the lumen 932. In such an embodiment, the barrier at the distal end of the lumen 932 may be any suitable barrier. The barrier may allow pressure from the blood of the vessel 200 to compress the fluid 934 within the lumen 932. In this way, the pressure of the fluid 934 within the lumen 932 may be the same as the pressure of the blood within the vessel 200. The pressure sensor 924b may then measure the pressure of the fluid 934 within the lumen 932. This pressure may be conveyed to the data acquisition system (e.g., the data acquisition system 101) as the blood pressure of the lumen 200.

In some embodiments, the endovascular device 903 may define an additional lumen in addition to the lumen 932 described. The additional lumen defined by the device 903 may correspond to the device 902b. For example, the endovascular device 903 may be define a lumen sized and shaped to receive the device 902b. In some embodiments, the endovascular device 903 may be a guide catheter. In some embodiments, any of the devices 903 or 902b described may additionally be positioned around a guidewire, like any of the guidewires described herein.

Figure 11:
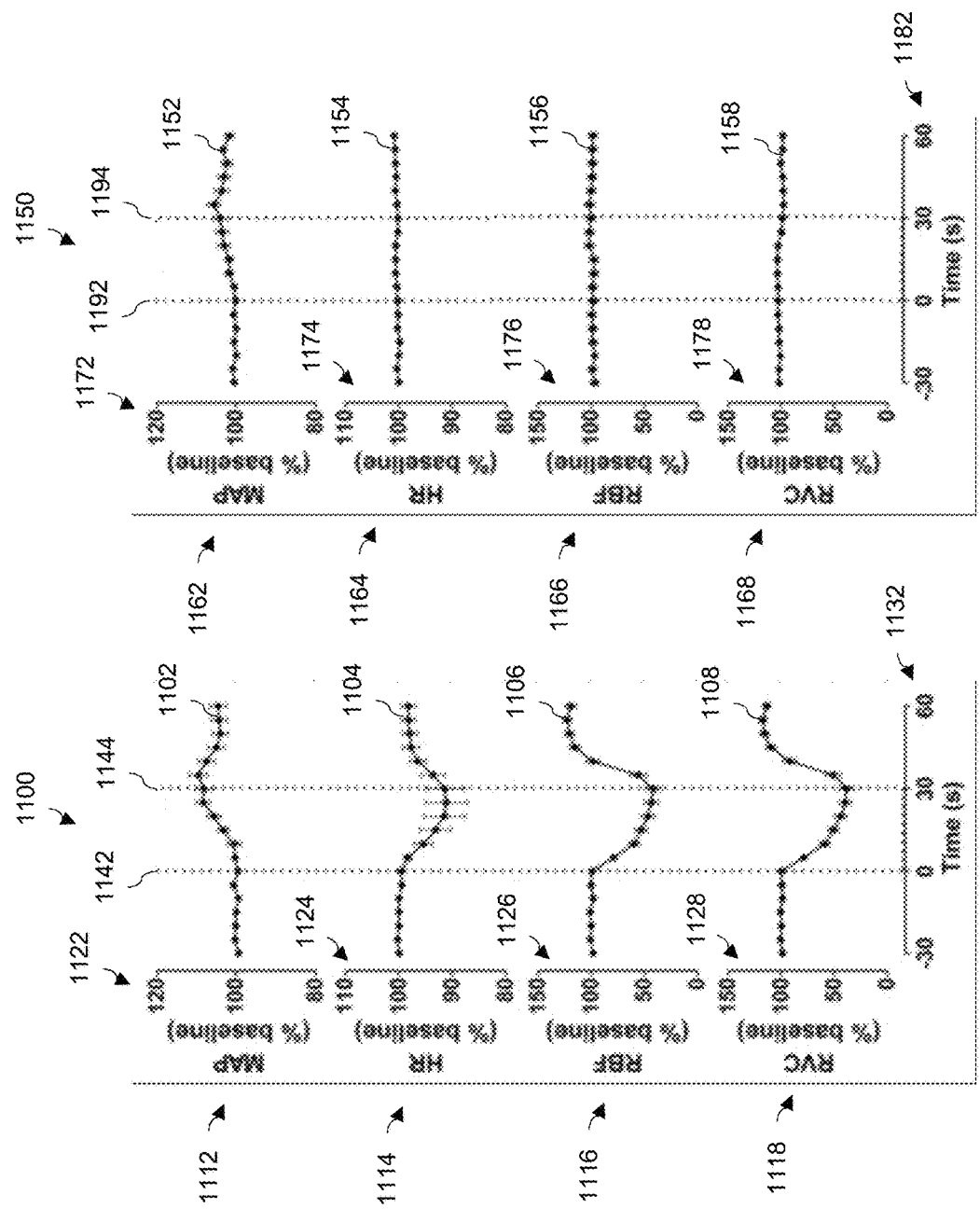
FIG. 11 is a diagrammatic view of hemodynamic data associated with a nerve stimulation procedure, according to aspects of the present disclosure.

FIG. 11 is a diagrammatic view of hemodynamic data associated with a nerve stimulation procedure, according to aspects of the present disclosure. The hemodynamic data may include a set of data 1100 and a set of data 1150.

In one embodiment, the data set 1100 may correspond to hemodynamic measurements during stimulation of a renal nerve and the data set 1150 may correspond to hemodynamic measurements of a different renal nerve during stimulation. In such an embodiment, the data set 1100 may be acquired by an endovascular device (e.g., the device 902a of FIG. 10A or the devices 902b and 903 of FIG. 10B) at one location along a renal artery. The data set 1150 may be acquired by the same device at a different location along the same renal artery.

In another embodiment, the data set 1100 may correspond to hemodynamic measurements of one patient at a location along the renal artery of the patient and the data set 1150 may correspond to hemodynamic measurements of a different patient. The data of the data sets 1100 and 1150 may be acquired at any suitable location along the renal arteries of both patients.

The data set 1100 may include any suitable hemodynamic data. As an example, the data set 1100 shown in FIG. 11 may include four plots associated with four hemodynamic parameters.

The plot 1112 may correspond to a mean arterial pressure (MAP) of the blood within the patient vasculature. The plot 1112 may include an axis 1122. The axis 1122 may define a scale associated with blood pressure measurements. The MAP axis 1122 may provide a visual illustration of mean blood pressure measurements within the renal artery. For example, it may provide a reference such that locations of blood pressure measurements may indicate the corresponding value. The range of the MAP axis 1122 may be automatically adjusted by the processor circuit of the system 100 or may be adjusted by a user.

The plot 1112 may additionally correspond to a time axis 1132. The time axis 1132 shown in FIG. 11 may be similar to the time axis 526 described with reference to FIG. 5. For example, the time axis 1132 may illustrate elapsed time of a procedure. Any region of the time axis 1132 may correspond to any time of the procedure. Like the time axis 526 of FIG. 5, the time axis 1132 may be continuously shifted so as to display the time of the most recent measurement and an arbitrary number of previous times as well. As shown in FIG. 11, the time axis 1132 may correspond to multiple plots of the data set 1100. For example, the time axis 1132 may correspond to the plot 1112, as described, as well as the plot 1114, the plot 1116, and the plot 1118.

The plot 1112 may additionally include multiple MAP data points 1102. Each MAP data point 1102, or blood pressure data point, may include a two-coordinate data point including a MAP measurement value and a time value. The MAP measurement value may correspond to the blood pressure measured by a pressure sensor (e.g., the pressure sensor 924a and/or the pressure sensor 924b of FIGS. 10A and 10B). The time value may correspond to the time along the time axis 1132 at which the associated blood pressure measurement was acquired. In this way, the data points 1102 may be positioned within the plot 1112 so as to correspond to the pressure value and the time value.

The dataset 1100 includes the plot 1114. The plot 1114 corresponds to a heart rate (HR) parameter. The plot 1114 includes an HR axis 1124. The HR axis 1124 may display heart rate values as percentages of an initial baseline value. In other embodiments, the heart rate axis 1124 may include a scale of actual heart rate values in units of, for example, beats per minute, or any other suitable units. Similar to the plot 1112, the plot 1114 corresponds to the time axis 1132 shown below. The plot 1114 additionally includes multiple HR data points 1104. Like the data points 1102 of plot 1112, the data points 1104 may each include a two-dimensional coordinate related to a heart rate value and a time value and the data points 1104 may be positioned within the plot 1114 based on these values. In some aspects, the heart rate of the patient may be measured based on the measured pressure (e.g., see plot 1112). In some aspects, the heart rate may be measured directly (e.g., using a cuff).

The data set 1100 additionally includes the plot 1116 and the plot 1118. These plots 1116 and 1118 may correspond to the same time axis 1132 described previously. The plot 1116 may illustrate renal blood flow values. The plot 1116 additionally includes an axis 1126 corresponding to renal blood flow (RBF) values. The axis 1126 may indicate a percentage of a baseline value or may show renal blood flow in units of velocity, such as millimeters per second, or any other unit. The plot 1116 also includes RBF data points 1106 positioned according to the RBF and time value of each data point. It is noted that the plot 1116 may be similar to the plot 520 described with reference to FIG. 5 in that the plot 1116 as well as the plot 520 may illustrate renal blood flow measurements. The plot 1116, as well as any other plot described herein, may share any features or characteristics of the plot 520 described with reference to FIG. 5

The plot 1118 may illustrate renal vascular conductance values (RVC). The plot 1118 includes an axis 1128 which may indicate a percentage of a baseline value or may show renal vascular conductance in units of conductance, such as a unit relating to velocity of blood flow divided by pressure. The plot 1118 also includes RVC data points 1108 positioned according to the RVC and time value of each data point.

In some embodiments, the plots of the data set 1100 may include a dotted line 1142. The line 1142 may be a vertical line corresponding to a time measurement. The line 1142 may extend across all of the plots of the data set 1100. In one embodiment, the line 1142 may correspond to the time at which a nerve stimulation device (e.g., the device 902*a* of FIG. 10A or the device 903*a* of FIG. 10B) began to stimulate the renal nerves. The line 1142 may be similar to the line 522 of FIG. 5. In this way, the line 1142 may be of any suitable visual appearance as described with reference to the line 522.

An additional dotted line 1144 is also shown. The line 1144 may be a vertical line corresponding to a time measurement and may be overlaid over all the plots of the dataset 1100. In one embodiment, the line 1144 may correspond to the time at which the nerve stimulation device stopped stimulating the renal nerves. The line 1144 may be similar to the line 524 described with reference to FIG. 5 and may be of any suitable appearance.

By displaying the lines 1142 and 1144, the system 100 may identify the times at which the nerve stimulation device was stimulating the renal nerves and the user of the system 100 may see the effect of renal nerve stimulation on the arterial blood pressure (MAP), the heart rate (HR), the renal blood flow (RBF), and the renal vascular conductance (RVC). Like the plot 520, the region between the lines 1142 and 1144 may be further visually differentiated from other regions of the plots in any suitable way.

As previously mentioned, the data set 1100 and the data set 1150 may correspond to hemodynamic measurements of different nerves within the same patient. The data set 1100 and the data set 1150 may alternatively correspond to hemodynamic measurements of the renal arteries of different patients.

The data set 1150 may include any of the features described with reference to the data set 1100. Specifically, the data set 1150 includes the plots 1162, 1164, 1166, and 1168. The plot 1162 illustrates MAP measurements and includes data points 1152 corresponding to a MAP axis 1172 and the time axis 1182. The plot 1164 illustrates HR measurements and includes data points 1154 corresponding to an HR axis 1174 and the time axis 1182. The plot 1166 illustrates RBF measurements and includes data points 1156 corresponding to an RBF axis 1176 and the time axis 1182. The plot 1168 illustrates RVC measurements and includes data points 1158 corresponding to an RVC axis 1178 and the time axis 1182.

Each of the parameters shown in the data set 1100 and data set 1150 (e.g., MAP, HR, RBF, and RVC measurements) may be obtained by a data acquisition system (e.g., the data acquisition system 101) in communication with one or more data acquisition devices (e.g., the flow sensor 1024 and/or the pressure sensor 924*a* or 924*b*). In some embodiments, the MAP (blood pressure) values of the plots 1112 and 1162 may be obtained by the pressure sensor 924*a* or 924*b* of the endovascular devices 902*a* or 903 respectively. In some embodiments, the heart rate data of plots 1114 and 1164 may be obtained based on the pressure data. In some embodiments, the heart rate data of plots 1114 and 1164 may be obtained based on flow data or electrocardiogram (ECG) data. In some embodiments, this heart rate data may be obtained another way, such as with a different device, such as an extraluminal device. As discussed previously, the renal blood flow data of plots 1116 and 1166 may be obtained by the flow sensor 1024 shown in FIG. 10A and FIG. 10B. The renal vascular conductance data may be determined based on a combination of the renal blood flow data and mean arterial pressure. In this way, by obtaining both pressure data and flow data by the sensors of the devices previously described the system 100 may obtain the four hemodynamic measurements shown in FIG. 11. It is contemplated that additional hemodynamic parameters may be determined based on the blood pressure and blood flow data. In this way, the system 100 advantageously provides a user of the system 100 with a more comprehensive view of how nerve stimulation affects the renal nerves of a patient. The physician may then more accurately determine if a patient is more or less likely to respond to renal denervation treatment.

As shown in FIG. 11, the mean arterial pressure may be seen to increase in response to renal nerve stimulation. This is shown most clearly by the plot 1112 of FIG. 11. A slight increase in blood pressure is also seen in FIG. 1162, though it is not as dramatic. The plot 1114 shows that the heart rate of the patient decreases in response to renal nerve stimulation. Similarly, the renal blood flow and renal vascular conductance also decrease in response to renal nerve stimulation, as shown by the plots 1116 and 1118.

By observing the response of all of these hemodynamic parameters to renal nerve stimulation, the physician or user of the system 100 may assess whether a renal denervation procedure would be effective. A renal denervation procedure is typically effective at decreasing blood pressure (e.g., relieving hypertension) in patients in which the renal nerves respond to renal nerve stimulation as shown in the plots of the data set 1100. For example, the data set 1100 may provide an example of hemodynamic parameters of a patient or nerve which would likely respond well to a renal denervation procedure because the renal nerves of the patient responded to renal stimulation. The data set 1150, on the other hand, may provide an example of hemodynamic parameters of a patient or nerve which would not likely respond well to a renal denervation procedure because the renal nerves did not respond in any significant way to renal stimulation.

A physician may use the data sets 1100 and/or 1150 to determine whether a renal denervation procedure should be performed. For example, if during a renal stimulation procedure, the physician observed hemodynamic measurements similar to those of the data set 1100, the physician may determine that a renal denervation procedure should be performed. On the other hand, if the physician observed hemodynamic parameters similar to the data set 1150, the physician may determine that a renal denervation procedure should not be performed because it would not be effective and would unnecessarily expose the patient to potential negative side effects of a renal ablation procedure.

As described in the present disclosure, measuring blood flow may advantageously provide additional insights into the hemodynamic response of the renal artery to renal nerve stimulation. For example, as shown in the data set 1100, the blood flow of the patient in the renal artery may be more dramatically affected by nerve stimulation than hemodynamic parameters related to blood pressure. Specifically, as shown in the plot 1116, the renal blood flow through the renal artery during nerve stimulation may decrease from a baseline value to 50% of this baseline value. Similarly, renal vascular conductance, as shown by the plot 1118 may decrease from a baseline value to 50% as well. However, other hemodynamic parameters, such as those based on blood pressure, may be less affected by renal nerve stimulation. For example, as shown in the plot 1112 the blood pressure of the patient may increase from the baseline value to about 110% in response to renal nerve stimulation. Similarly, the heart rate parameter shown in 1114 may be less affected by renal nerve stimulation. Under stimulation, the heart rate of the patient may drop from a baseline value to about 90%. Due to this more dramatic effect of nerve stimulation on blood flow within the renal artery, measuring blood flow may be a more suitable metric to measure renal nerve stimulation response. In this way, a physician may more effectively and accurately determine whether a patient, or a particular nerve, will respond positively to a renal denervation procedure.

Additionally, as shown by the response of blood pressure in plot 1162, blood pressure within a body may be affected by renal nerve stimulation, but may also be affected by various other conditions or stimuli within the body. By providing information related to blood flow and/or heart rate, a physician may determine whether changes in blood pressure during nerve stimulation are a direct result of renal nerve stimulation or are a result of other unknown causes. In the example shown in FIG. 11, the plot 1162 illustrates a slight increase in blood pressure during nerve stimulation. Specifically, the blood pressure within the patient is observed to increase gradually from a baseline to around 105%. Initially, this increase in blood pressure may lead a physician or user of the system 100 to determine that the renal nerve did respond to stimulation and that it would be a good candidate for renal denervation. However, as shown in the plots 1166 and 1168, little to no change in renal blood flow was observed as a result of the same stimulation. This may indicate to the physician that the increase in blood pressure shown in the plot 1162 may be an anomaly. For example, the increase in blood pressure of plot 1162 may have been a result of other factors and the renal nerve stimulated would not be a good candidate for renal denervation.

It is additionally noted that all percentage or other values described herein are merely exemplary and for pedagogical purposes only. Any suitable values including percentages of baseline values of hemodynamic parameters may be contemplated.

Figure 12:
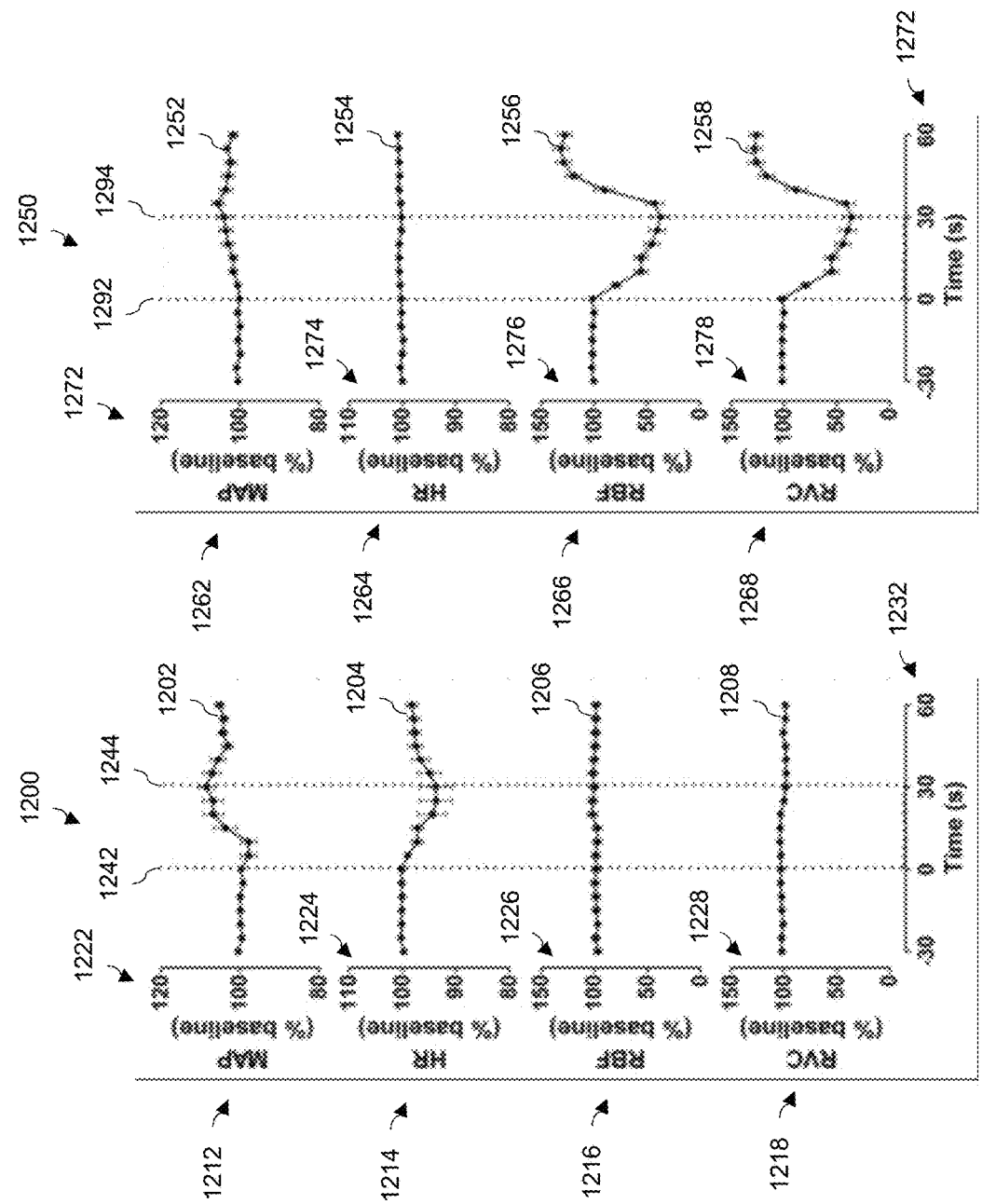
FIG. 12 is a diagrammatic view of hemodynamic data associated with a nerve stimulation procedure, according to aspects of the present disclosure.

FIG. 12 is a diagrammatic view of hemodynamic data associated with a nerve stimulation procedure, according to aspects of the present disclosure. The hemodynamic data may include a set of data 1200 and a set of data 1250.

Like the data sets 1100 and 1150 of FIG. 11, the data set 1200 may correspond to hemodynamic measurements of a renal nerve and the data set 1250 may correspond to hemodynamic measurements of a different renal nerve. The data sets 1200 and 1250 may correspond to measurements obtained at different locations within the renal artery. In some embodiments, the data sets 1200 and 1250 may correspond to hemodynamic measurements from different patients. The data of the data sets 1200 and 1250 may be acquired at any suitable location along the renal arteries of both patients. The data sets 1200 and 1250 may correspond to the same four hemodynamic parameters described with reference to FIG. 11. For example, the data set 1200 and data set 1250 may each include MAP data, HR data, RBF data, and RVC data.

Referring to the data set 1200, the data set 1200 may include a time axis 1232. The time axis 1232 may be similar to the time axis 1132 described with reference to FIG. 11. Specifically, the time axis 1232 may correspond to all of the plots of the data set 1200. The time axis 1232 may be adjusted and/or shifted in real time or otherwise according to any suitable method, including those described with reference to the time axis 1132 of FIG. 11 and/or the time axis 526 of FIG. 5.

100 may see the effect of renal nerve stimulation on the arterial blood pressure (MAP), the heart rate (HR), the renal blood flow (RBF), and the renal vascular conductance (RVC). Like the plot 520, the region between the lines 1142 and 1144 may be further visually differentiated from other regions of the plots in any suitable way.

As previously mentioned, the data set 1100 and the data set 1150 may correspond to hemodynamic measurements of different nerves within the same patient. The data set 1100 and the data set 1150 may alternatively correspond to hemodynamic measurements of the renal arteries of different patients.

The data set 1200 may include any of the features described with reference to the data set 1100. Specifically, the data set 1200 includes the plots 1212, 1214, 1216, and 1218. Each of the measurement axes (e.g., the MAP axis 1222, the HR axis 1224, etc.) may be similar to the measurement axes described with reference to FIG. 11. The plot 1212 illustrates MAP measurements and includes data points 1202 corresponding to a MAP axis 1222 and the time axis 1232. The plot 1214 illustrates HR measurements and includes data points 1204 corresponding to an HR axis 1224 and the time axis 1232. The plot 1216 illustrates RBF measurements and includes data points 1206 corresponding to an RBF axis 1226 and the time axis 1232. The plot 1218 illustrates RVC measurements and includes data points 1208 corresponding to an RVC axis 1228 and the time axis 1232.

The data set 1250 may be similar to the other data sets described with reference to FIG. 11 and FIG. 12. Specifically, the data set 1250 includes the plots 1262, 1264, 1266, and 1268. Each of the measurement axes (e.g., the MAP axis 1272, the HR axis 1274, etc.) may be similar to the measurement axes described with reference to FIG. 11. The plot 1262 illustrates MAP measurements and includes data points 1252 corresponding to a MAP axis 1272 and the time axis 1272. The plot 1264 illustrates HR measurements and includes data points 1254 corresponding to an HR axis 1274 and the time axis 1232. The plot 1266 illustrates RBF measurements and includes data points 1256 corresponding to an RBF axis 1276 and the time axis 1272. The plot 1268 illustrates RVC measurements and includes data points 1258 corresponding to an RVC axis 1278 and the time axis 1272.

In some embodiments, a physician may use the data sets 1100 and/or 1150 to determine whether a renal nerve is an afferent nerve or an efferent nerve. Referring again to FIG. 4, multiple renal nerves 120 may be positioned around the renal artery 80. These renal nerves may be the nerves stimulated as described with reference to FIG. 11 and FIG. 12. The renal nerves 120 may include both afferent nerves and efferent nerves. For purposes of the present disclosure, an afferent nerve may correspond to neurons that receive information from sensory organs (e.g., the kidney, or other organs) and transmit this sensory information to the central nervous system. Afferent nerves may transmit neurons from a sensory organ to the central nervous system. By contrast, efferent nerves may correspond to neurons that send impulses from the central nervous system to other parts of the body (e.g., the kidney, or other organs or limbs). Efferent nerves may, therefore, receive neurons from the central nervous system and may cause a response in an organ, such as the kidney.

In some aspects, ablating an efferent renal nerve may have a greater effect on decreasing blood pressure in patients than ablating an afferent nerve. As a result, a physician may wish to identify and ablate efferent nerves as opposed to afferent nerves. Based on the hemodynamic data described herein, a processor circuit of the system 100 and/or a user of the system 100 may determine whether a particular renal nerve is afferent or efferent.

For instance, as shown in FIG. 12, the data set 1200 may be exemplary of an afferent nerve under stimulation. The data set 1250 may be exemplary of an efferent nerve under stimulation. In the example shown in FIG. 12, an afferent nerve may be identified by observing an increase in blood pressure and a decrease in heart rate under stimulation while blood flow remains largely unchanged. For example, as shown in FIG. 12, the plot 1212 may shows an increase in blood pressure in the region between the lines 1242 and 1244 corresponding to nerve stimulation. In addition, as shown by the plot of 1214, the heart rate the patient is also observed to decrease in the region between the lines 1242 and 1244. However, the renal blood flow, as shown in the plot 1216, may remain substantially unchanged through the region between the lines 1242 and 1244 corresponding to nerve stimulation. Similarly, the renal vascular conductance, as shown by the plot 1218, may be substantially unchanged through the region associated with nerve stimulation. This change in the blood pressure and heart rate with little to no change in the blood flow measurement plots may correspond to an afferent nerve. Based on a comparison of the plots of the data set 1200, the processor circuit of the system 100, or a user, may determine that the nerve associated with the data set 1200 is afferent.

The data set 1250 may be exemplary of an efferent nerve under stimulation. In the example shown in FIG. 12, an efferent nerve may be identified by observing a decrease in blood flow under stimulation while blood pressure and heart rate measurements remain largely unchanged. For example, as shown in FIG. 12, the plot 1262 may show little to no change in the blood pressure under stimulation (e.g., the region between the lines 1292 and 1294). Similarly, the plot 1264 may show little to no change in the heart rate under stimulation. However, the renal blood flow, as shown in the plot 1266, may decrease through the region between the lines 1292 and 1294 corresponding to nerve stimulation. Similarly, the renal vascular conductance plot 1268 may illustrate a decrease in the renal vascular conductance throughout nerve stimulation. This change in the renal blood flow and renal vascular conductance with little to no change in the mean arterial pressure and heart rate measurements may correspond to an efferent nerve. Based on a comparison of the plots of the data set 1250, the processor circuit of the system 100 or a user may determine that the nerve associated with the data set 1250 is efferent.

As described, the physician may choose, or a processor circuit may be configured to recommend, that a renal denervation procedure be conducted for efferent nerves, such as the one associated with the data set 1250. On the other hand, a renal denervation procedure may not be recommended or conducted for afferent nerves, such as the one associated with the data set 1200.

In some embodiments, aspects of the data sets 1100, 1150, 1200, and/or 1250, including any of the plots of hemodynamic measurements, may be generated and displayed to a user of the system 100, as will be described in more detail hereafter.

Figure 13:
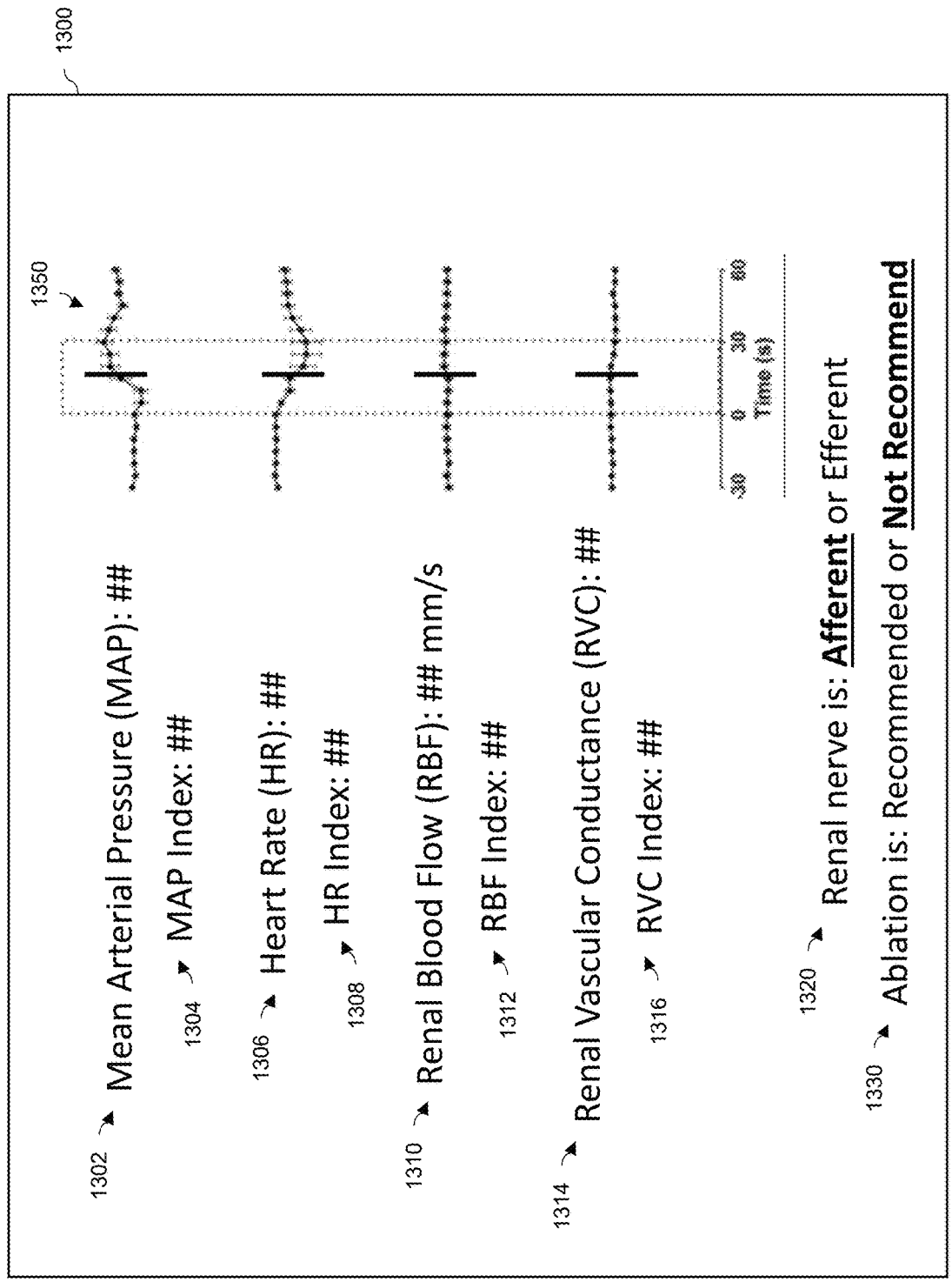
FIG. 13 is a diagrammatic view of a graphical user interface associated with a nerve stimulation procedure, according to aspects of the present disclosure.

FIG. 13 is a diagrammatic view of a graphical user interface 1300 associated with a nerve stimulation procedure, according to aspects of the present disclosure. The graphical user interface 1300 may be one exemplary embodiment of a display viewed by a user of the system 100. The graphical user interface 1300 may be displayed to a user via the display 108 (FIG. 1) or by any other means.

The graphical user interface 1300 includes a data set 1350, and various hemodynamic measurements associated with the data set 1350 along with recommendations for a user. For example, the data set 1350 may be substantially similar to any of the data sets 1100, 1150, 1200, and/or 1250 described previously with reference to FIG. 11 and FIG. 12. Specifically, the data set 1350 may include a number of plots and/or data points corresponding to mean arterial pressure, heart rate, renal blood flow, and/or renal vascular conductance. In addition, the data set 1350 may include various axes, such as a time axis as well as axes corresponding to any of the hemodynamic parameters described herein. The data set 1350 may additionally include two or more lines identifying a region along the time axis corresponding to renal nerve stimulation.

Various metrics may be displayed to a user within the graphical user interface 1300. As an example, a mean arterial pressure metric 1302 may be displayed to a user. In some embodiments, the mean arterial pressure metric 1302 may correspond to a pressure measurement of the data set 1350. For example, the mean arterial pressure metric 1302 displayed in the graphical user interface 1300 may be associated with one of the data points of mean arterial pressure of the dataset 1350. The metric 1302 may correspond to a pressure measurement associated with a marker which may be displayed overlaid over the data set 1350 on the pressure curve. This overlaid marker may be substantially similar to the marker 512 described with reference to FIG. 5. In some embodiments, the mean arterial pressure metric 1302 may be associated with a data point of the data set 1350 acquired most recently.

A heart rate metric 1306 may additionally be displayed to a user of the system 100. The heart rate metric 1306 may share various characteristics as the mean arterial pressure metric 1302. For example, the heart rate metric 1306 may correspond to a marker overlaid over part of the data set 1350. The heart rate metric 1306 may alternatively correspond to the last obtained heart rate data point.

A renal blood flow metric 1310 and a renal vascular conductance metric 1314 may be additionally displayed within the graphical user interface 1300. The renal blood flow metric 1310 and the renal vascular conductance metric 1314 may be similar to the mean arterial pressure metric 1302 and the heart rate metric 1306. For example, the metric 1310 and/or the metric 1314 may correspond to respective markers within the data set 1350. In other embodiments, the metric 1310 and the metric 1314 may correspond to a last obtained renal blood flow measurement data point, or last obtained renal vascular conductance data point respectively.

In some embodiments, the processor circuit of the system 100 may be configured to receive a user input moving a marker overlaid over the data set 1350. For example, a user may select a marker corresponding to mean arterial pressure and move it to another location along the plot. In response to this movement, the mean arterial pressure metric 1302 may be updated to reflect the pressure measurement at the new location of the marker. In some embodiments, markers associated with the heart rate metric, the renal blood flow metric, and/or in the renal vascular conductance metric may similarly be moved in response to a user moving the marker associated with the mean arterial pressure metric 1302. In other embodiments, a user input moving a marker corresponding to one parameter, such as the mean arterial pressure metric 1302, may not cause other markers associated with other hemodynamic parameters to move.

Additionally shown in FIG. 13, are a number of indices. For example, a MAP index 1304 is shown proximate to the mean arterial pressure metric 1302. The MAP index 1304 may be substantially similar to the index 504 described with reference to FIG. 5. For example, the MAP index 1304 may be calculated by the processor circuit of the system 100 based on a comparison of a baseline mean arterial pressure value and a mean arterial pressure value of the data under nerve stimulation. This comparison may be similar to the calculation described with reference to FIG. 5, including equation 1 or equation 2. In this way, the change in arterial pressure before, throughout, and after a nerve stimulation procedure may be quantified and simplified into one value. The MAP index 1304 may therefore quickly and efficiently convey to a user of the system 100 the extent to which the mean arterial pressure was affected by a nerve stimulation procedure.

Similarly, an HR index 1308 may be displayed proximate to the heart rate metric 1306. The HR index 1308 may be similar to the index 1304 as well as the index 504 described with reference to FIG. 5. Specifically, the HR index 1308 may be calculated in a similar way and may compare a baseline value of heart rate before nerve stimulation with a minimum or other value of heart rate during nerve stimulation.

The RBF index 1312 and RVC index 1316 may be calculated in similar ways. By calculating and displaying indices associated with each hemodynamic parameter, the processor circuit of the system 100, or a user of the system 100, may quickly determine to what extent each of the hemodynamic parameters were affected by a nerve stimulation procedure. These indices, in conjunction with the data set 1350 providing a visual representation of how much these hemodynamic parameters were affected by nerve stimulation, may provide a user with a quick and efficient view of the effects of renal nerve stimulation.

In some embodiments, the processor circuit of the system 100 may additionally be configured to display whether the renal nerve associated with the data set 1350 displayed is an afferent nerve or an efferent nerve. The processor circuit of the system 100 may be configured to make this determination based on any of the observed responses of the renal nerves as described and shown in FIG. 12. For example, as has been explained previously, a change in the hemodynamic measurements of mean arterial pressure and heart rate with little to no change in renal blood flow or renal vascular conductance may indicate an afferent nerve, and vice versa indicating an efferent nerve. As shown in the data set 1350, as well as the parameter indices (e.g., MAP index 1304, HR index 1308, RBF index 1312, and RVC index 1316), the renal nerve associated with the data set 1350 may be an afferent nerve. The processor circuit of the system 100 may be configured to identify that the renal nerve is afferent as shown by the indication 1320. In some embodiments, the processor circuit of the system 100 may be configured to display both options (e.g., afferent or efferent) and highlight or visually differentiate the correct option over the other. In other embodiments, the indication that the renal nerve is an afferent or an efferent nerve may be done in any other way.

In some aspects, the stimulated area of the renal artery may be associated with both afferent and efferent nerves. In such case, a response by the sympathetic nervous system may be observed as has been explained with reference to FIGS. 12 and 13, but the response may not be as pronounced. In some aspects, the processor circuit may analyze the data to determine that a region of the renal artery contains both afferent and efferent nerves and may display such to the user in any suitable way. In aspects in which little to no nerves are present along the renal artery, the processor circuit may analyze the data and observe little to no response from the sympathetic nervous system, as has been explained.

In addition, the processor circuit of the system 100 may be configured to determine a recommendation regarding ablation. For example, the processor circuit of the system 100 may be configured to recommend that a renal denervation procedure be performed based on whether the nerve or the patient responded correctly to a nerve stimulation procedure. For example, as described with reference to FIG. 11, if during a nerve stimulation procedure, the four hemodynamic parameters described herein do not change in response to nerve stimulation, the nerve may be said to not respond correctly to nerve stimulation. Based on this condition, the processor circuit may recommend that a renal denervation procedure not be performed. Similarly, if, as shown in the data set 1100 of FIG. 11, the hemodynamic parameters are observed to change in response to nerve stimulation, the processor circuit may recommend that a renal denervation procedure be performed. In some embodiments, the processor circuit of the system 100 may be configured to recommend that an ablation procedure be performed based on whether the renal nerve is an afferent or an efferent nerve. As described, an afferent nerve may not respond to a nerve stimulation procedure in the same way that an efferent nerve responds. Specifically, if an efferent nerve is ablated, the blood pressure within the patient may be predicted to decrease. In contrast, if an afferent nerve is ablated, the blood pressure within the patient may be predicted to remain unchanged or may response less than compared to an efferent nerve. As a result, the processor circuit of the system 100 may be configured to recommend ablation based on the classification of a nerve as afferent or efferent. For example, as shown in FIG. 13, the data set 1350 and corresponding indices may correspond to an afferent nerve. As a result, the processor circuit may recommend that an ablation procedure not be performed as shown by the indication 1330. Similar to the indication 1320, the processor circuit may display both options (e.g., recommended or not recommended) and may highlight or otherwise differentiate the correct option or recommendation.

Figure 14:
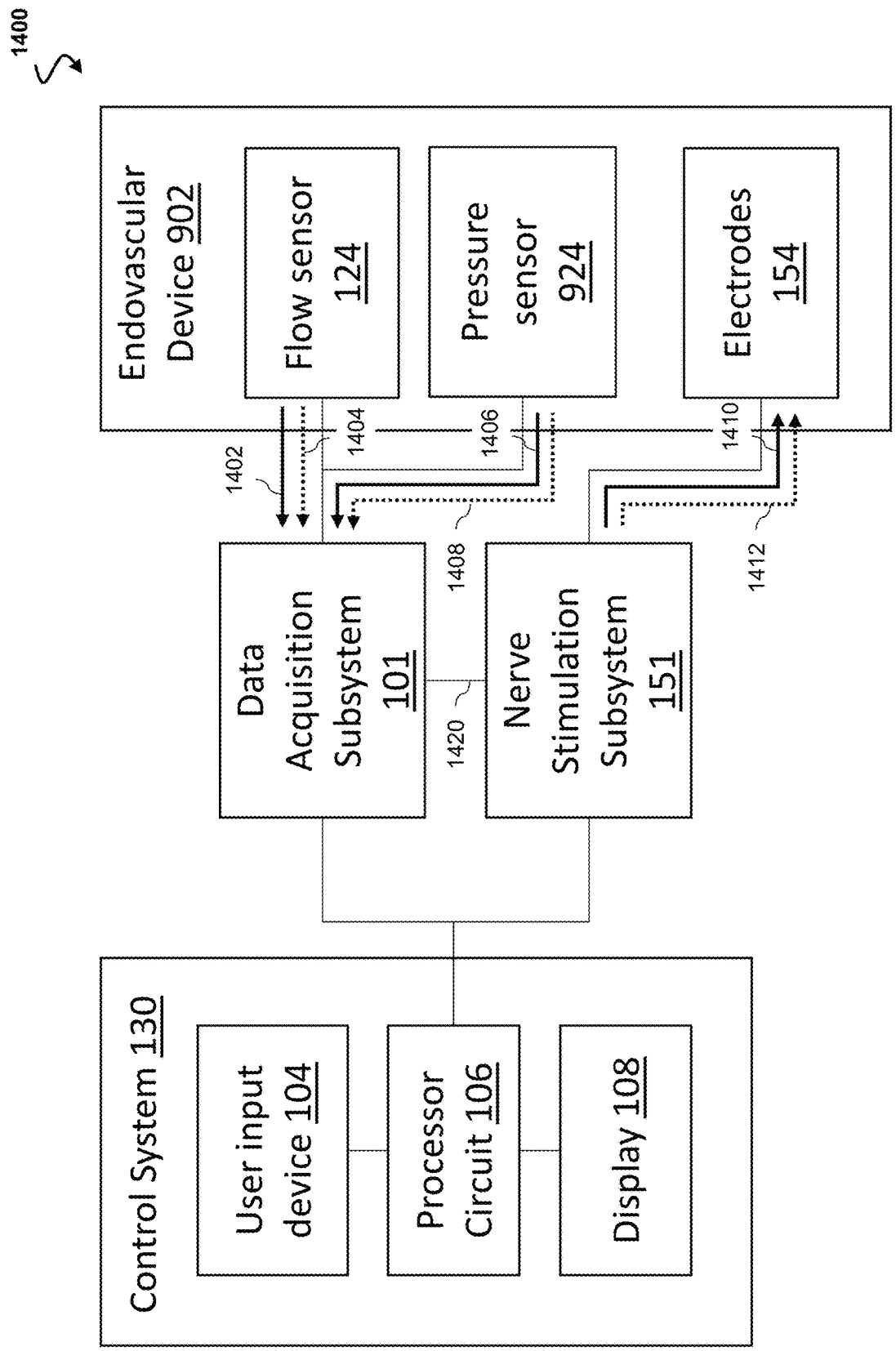
FIG. 14 is a schematic diagram of a data acquisition and nerve stimulation system, according to aspects of the present disclosure.

FIG. 14 is a schematic diagram of a data acquisition and nerve simulation system 1400, according to aspects of the present disclosure. The system 1400 may be similar to the data acquisition and nerve stimulation system 900 previously described with reference to FIG. 9. Similar to the data acquisition and nerve simulation system 900 previously described, the system 1400 may include the control system 130, the data acquisition subsystem 101, the nerve stimulation subsystem 151, the endovascular device 902.

The data acquisition and nerve stimulation system 1400 may differ from the systems described previously. In one aspect, as shown by the line 1420, the data acquisition subsystem 101 and the nerve stimulation subsystem 151 may be in direct communication with one another. In this way, the nerve stimulation subsystem 151 may receive inputs from the data acquisition subsystem 101 and vice versa. In some embodiments, either of these subsystems may use inputs from the other subsystem to adjust parameters of data acquisition or nerve stimulation respectively.

As an example, shown in FIG. 14, During a nerve stimulation procedure, the endovascular device 902 may acquire blood velocity data with the flow sensor 124 and blood pressure data with the pressure sensor 924. In one example, the nerve stimulation subsystem 151 may control the electrodes 154 to begin emitting electrical pulses to stimulate surrounding renal nerves. During this stimulation process, the flow sensor 124 and the pressure sensor 924 may continuously acquire new measurement data. As an example, the flow sensor 124 may acquire data related to blood velocity and transmit the data to the data acquisition subsystem 101, as shown by the arrow 1402. Similarly, the pressure sensor 924 may acquire pressure data and send this data to the data acquisition subsystem 101, as shown by the arrow 1406. The data acquisition subsystem 101 may then transmit this blood flow data and blood pressure data to the nerve stimulation subsystem 151. In some embodiments, the data acquisition subsystem 101 may process the data received from the flow sensor 124 and the pressure sensor 924 prior to transmitting it or other data or signals to the nerve stimulation subsystem 151. For example, the data acquisition subsystem 101 make compare the received data to data received at earlier times during the nerve stimulation procedure. For example, referring to the data set 1100 of FIG. 11, throughout a nerve stimulation procedure, blood pressure data and blood flow data is continuously acquired by the flow sensor 124 and the pressure sensor 924. This data may be used to generate plots relating to mean arterial pressure, heart rate, renal blood flow, and/or renal vascular conductance. As shown in the data set 1100, any of these parameters may change overtime, and in particular, may change in response to nerve stimulation. Referring again to FIG. 14, a processor circuit in communication with the data acquisition subsystem 101 may compare received hemodynamic measurement values to determine whether these values are increasing, decreasing, or remaining constant. As an example, the processor circuit in communication with the data acquisition subsystem 101 may compare renal blood flow measurements throughout a region between time −30 and zero corresponding to a time before nerve stimulation. Throughout this period, the data acquisition subsystem (e.g., the processor circuit in communication with the data acquisition subsystem) may determine that the renal blood flow is substantially unchanged. However, for the period of between the time zero and time 30 (e.g., between the lines 1142 and 1144 corresponding to nerve stimulation), the data acquisition subsystem 101 may determine that the renal blood flow is decreasing over time. Referring again to FIG. 14, as the subsystem 101 determines that the renal blood flow is decreasing, the subsystem 101 may send a signal to the nerve stimulation subsystem 151 directing the system 151 to continue stimulating the surrounding nerves. In response, the nerve stimulation subsystem 151 may transmit a signal or electrical pulse 1410 to the electrodes 154 to continue stimulating surrounding nerves.

As the nerve stimulation subsystem 151 continues to stimulate surrounding nerves, the data acquisition subsystem 101 may continue to receive hemodynamic pressure measurements from the flow sensor 124 and the pressure sensor 924. Transmission of flow information may be illustrated by the arrow 1404 and transmission of pressure information may be illustrated by the arrow 1408. The data acquisition subsystem 101 may determine, based on the inputs 1404 and 1408, that the renal blood flow has begun to stabilize, or that it remains substantially unchanged for a given period of time (e.g., after a threshold period of time). Based on these new measurements, the data acquisition subsystem 101 may generate a signal to the nerve stimulation subsystem 151 instructing the nerve stimulation subsystem 151 to stop stimulating surrounding renal nerves because, for example, a minimum renal blood flow has been achieved. The nerve stimulation subsystem 151 may then send a signal or command 1412 to the electrodes 154 to stop emitting electrical pulses.

As illustrated in FIG. 14, this communication between the data acquisition system 101 and the nerves stimulation system 151 may advantageously ensure that a maximum or minimum, whichever the case may be, hemodynamic measurement is obtained during a nerve stimulation procedure. This may ensure that the accuracy of the hemodynamic index values (e.g., the indices 1304, 1308, 1312, and/or 1316) is as high as possible.

In some embodiments, the processor circuit of the system 100 in communication with the data acquisition system 101 and/or the nerve stimulation subsystem 151 may be configured to impose a maximum time limit to the length of time the nerve stimulation subsystem 151 in conjunction with the electrodes 154 stimulate the renal nerves. For example, if the data acquisition subsystem 101 does not identify that the hemodynamic parameters obtained by the flow sensor 124 and/or the pressure sensor 924 are not changing or stabilizing before the end of a predetermined time limit, the nerve stimulation system 151 may stop stimulation to ensure a patient is not exposed to electrical stimulation for long lengths of time. For example, this time limit may be received by the processor circuit and may be based on recommendations from experts in the field.

Figure 15:
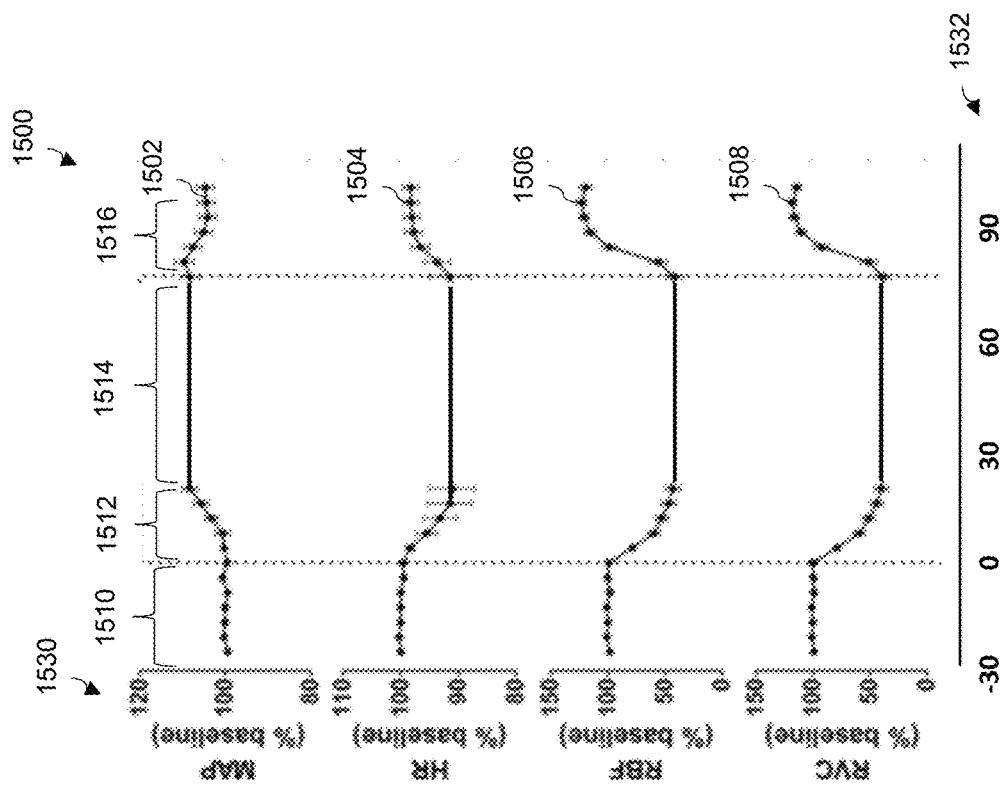
FIG. 15 is a diagrammatic view of hemodynamic data 1500 associated with a nerve stimulation procedure, according to aspects of the present disclosure.

FIG. 15 is a diagrammatic view of hemodynamic data 1500 associated with a nerve stimulation procedure, according to aspects of the present disclosure. The view of hemodynamic data 1500 may correspond to a nerve stimulation procedure conducted by the system 1400 described with reference to FIG. 14. The data set 1500 may be similar to the data sets previously described with reference to FIG. 11 and FIG. 12. For example, it may include multiple plots associated with MAP measurement values, HR measurement values, RBF measurement values, and/or RVC measurement values. These plots may each correspond to their own respective axes 1530 as well as a time axis 1532. The data set 1500 may include any features or characteristics of any other data sets described herein.

As an example, during a pre-stimulation phase 1510, each of the hemodynamic values may be largely constant. At phase 1512, however, the nerve stimulation subsystem 151 may begin to stimulate the renal nerves of the patient. In response, any of the hemodynamic parameters may being to change. For example, MAP values 1502 increase during the phase 1512. HR values 1504, RBF values 1506, and RVC values 1508 may all decrease during this same phase. As described with reference to FIG. 14, during this phase 1512, the data acquisition system 101 may recognize that the hemodynamics have not stabilized but are still constantly changing. As a result, the data acquisition subsystem 101 may transmit signals to the nerve stimulation subsystem 151 to continue to stimulate the renal nerves.

During a phase 1514, the hemodynamic parameters are seen to stabilize. As an example, the processor circuit of the data acquisition subsystem 101 may recognize that the parameters have begun to stabilize. In some embodiments, the processor circuit may determine a length of time corresponding to the length of the phase 1514 shown. After the parameters have remained substantially stable throughout this period of time, the data acquisition system 101 may send a signal to the nerve stimulation subsystem 151 to stop stimulating the renal nerves. The length of time corresponding to the phase 1514 may be any suitable length of time. This length of time may be determined by a user of the system 100 or may be determined by a processor circuit based on attributes of the patient, past medical history of other patients, or recommendation of experts in the field. After nerve stimulation has been stopped, as shown by the phase 1516, the hemodynamic measurements may return to a pre-stimulation level, such as the levels shown in phase 1510.

Figure 16:
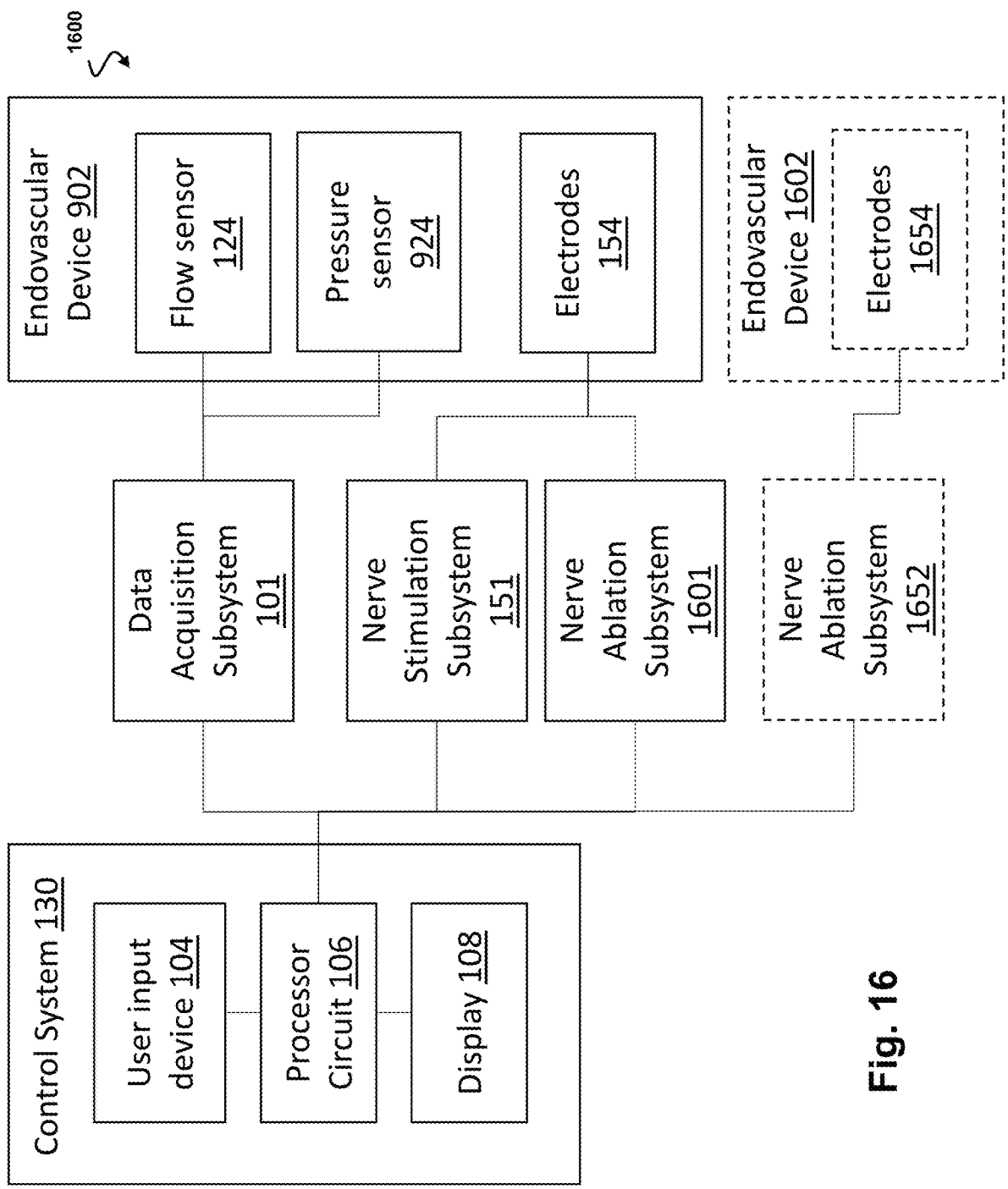
FIG. 16 is a schematic diagram of a data acquisition, nerve simulation, and nerve ablation system, according to aspects of the present disclosure.

FIG. 16 is a schematic diagram of a data acquisition, nerve simulation, and nerve ablation system 1600, according to aspects of the present disclosure. The system 1600 may be similar to the systems previously described with reference to FIG. 1, FIG. 6, FIG. 9, and/or FIG. 14. For example, the system 1600 may include the control system 130, the data acquisition subsystem 101, the nerve stimulation subsystem 151, the endovascular device 902.

The data acquisition, nerve stimulation, and nerve ablation system 1600 may differ from the systems described previously. In one aspect, the system 1600 may additionally include a nerve ablation subsystem 1601. The nerve ablation subsystem 1601, like the nerve stimulation subsystem 151 may be in communication with the processor circuit 106 of the control system 130 as well as the electrodes 154. The nerve ablation subsystem 1601 may be configured to ablate one or more renal nerves surrounding the renal artery. In some embodiments, ablating renal nerves may be referred to as a nerve ablation procedure or a renal denervation procedure. The nerve ablation subsystem 1601 may ablate nerves in any suitable way. In one example, the nerve ablation system 1601 may transmit one or pulses or command signals to the electrodes 154. In response to the received pulses or command signals, the electrodes 154 may transmit an electrical pulse into the surrounding environment. In some embodiments, the electrical pulse emitted by the electrodes during a renal denervation procedure in response to a command from the nerve ablation subsystem 101 may be different from the electrical pulse emitted during a nerve stimulation procedure. For example, a pulse of a nerve ablation procedure may be of a different frequency, voltage, amplitude, or any other characteristic. In some examples, the electrical pulse of a nerve ablation procedure may sever or otherwise disable renal nerves surrounding an ablation device.

In some embodiments, the nerve ablation device may refer to the nerve stimulation assembly of any of the endovascular devices previously described. As shown in FIG. 16, the nerve ablation subsystem 1601 may be in communication with the same electrodes 154.

In some embodiments, the ablation device may be a separate ablation device, such as the separate endovascular device 1602 shown. The endovascular device 1652 may be an ablation device. The endovascular device 1652 may include electrodes 1654. In some embodiments, the electrodes 1654 may be substantially similar to the electrodes 154. In some embodiments, the electrodes 1654 may differ from the electrodes 154. The endovascular device 1602 may be in communication with a separate nerve ablation subsystem 1652. The nerve ablation subsystem 1652 may be in communication with the processor circuit 106 of the control system 130. In some aspects, the device used to ablate renal nerves (e.g., the endovascular device 1602) may be any suitable type of ablation device. For example, the ablation device may include an ultrasound-based ablation device or an alcohol-based ablation device.

In some embodiments, the nerve endovascular device 1602 may be positioned within the renal artery at some point of time in a procedure after the endovascular device 902 has been removed. In other embodiments, the endovascular device 1602 and the endovascular device 902 may be positioned within the renal artery simultaneously.

Figure 17:
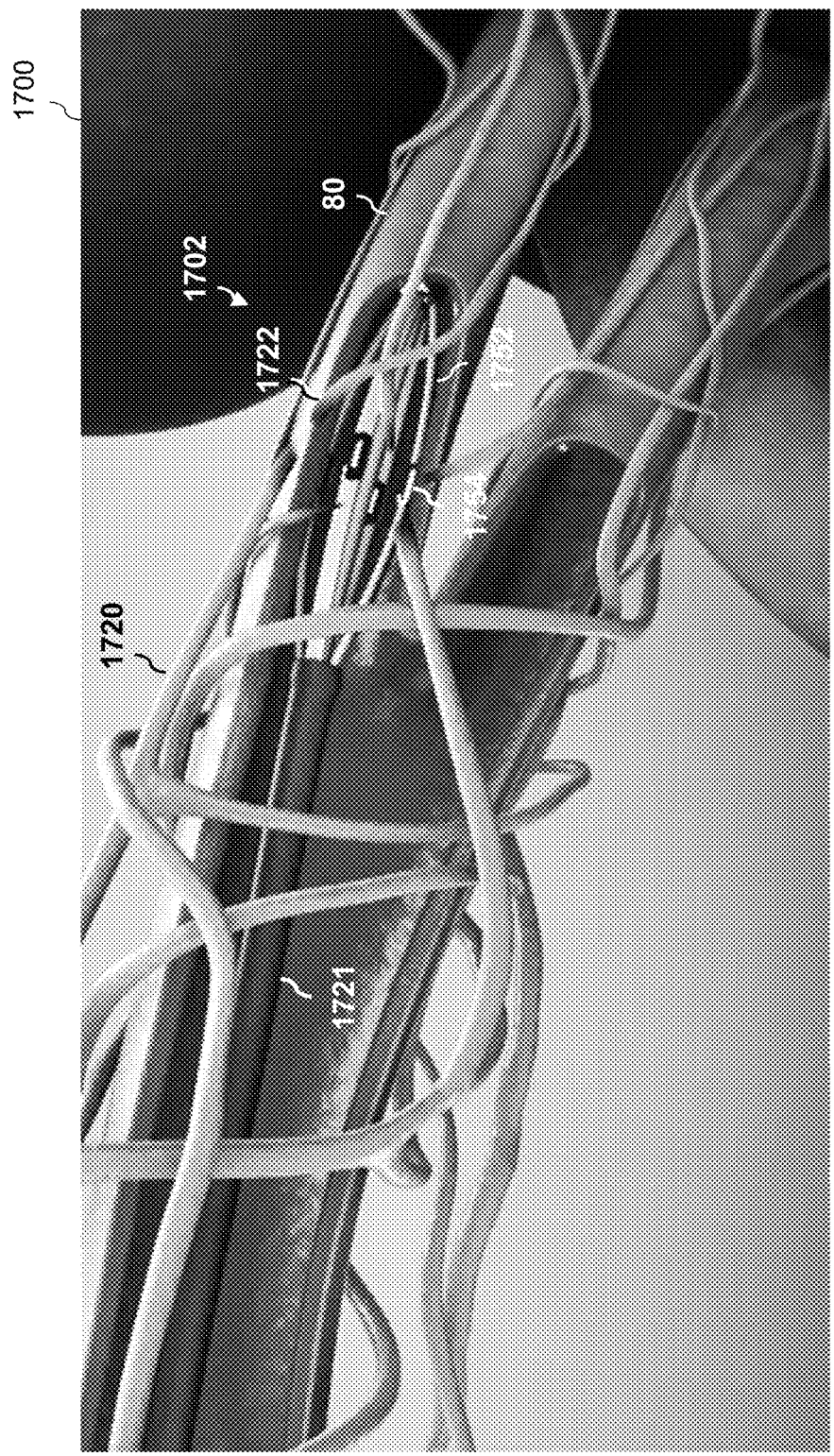
FIG. 17 is a diagrammatic view of a region of a patient anatomy, according to aspects of the present disclosure.

FIG. 17 is a diagrammatic view of a region of a patient anatomy, according to aspects of the present disclosure. FIG. 17 includes a diagrammatic extraluminal image 1700 of a section of the renal artery 80. The image 1700 may be an extraluminal image acquired with an extraluminal imaging system, such as an x-ray system. The image 1700 may also be a model of the anatomy.

FIG. 17 illustrates an embodiment of an ablation device positioned within the renal artery. In some embodiments, the ablation device may be the same device or a part of the endovascular device 902 and/or 1602 described with reference to FIG. 16. The ablation device 1702 shown in FIG. 17 may include a flexible elongate member 1721, a nerve ablation assembly 1752, and electrodes 1754, as well as other elements. The image 1700 includes a view of the renal artery 80 along with renal nerves 1720 positioned around the renal artery 80.

The flexible elongate member 1721 may define a central lumen in which the nerve ablation device 1702 may be positioned. The nerve ablation assembly 1752 may be similar to the nerve simulation assembly 152 described with reference to FIG. 4. For example, the nerve ablation assembly 1752 may include one or more electrodes 1754 positioned along the outer surfaces of one or more arms of the assembly 1752. The electrodes 1754 may, in this manner, be moved in a radial outward or inward direction corresponding to an expanded and unexpanded state. In an expanded state, the electrodes 1754 may contact the inner vessel wall of the artery 80. In this state, the electrodes 1754 may emit an ablation pulse which may ablate the renal nerves 1720.

As shown in FIG. 17, a nerve 1722 may be shown to be ablated by the ablation device 1702. This nerve may then not respond to neurons from the central nervous system and/or transmit neurons to the central nervous system. As described, this may help to remedy hypertension in some patients.

FIG. 18 is a diagrammatic view of a graphical user interface 1800 associated with a nerve stimulation procedure performed after a nerve ablation procedure, according to aspects of the present disclosure. In some embodiments, after a nerve ablation procedure is performed, as described with reference to FIG. 17, the system (e.g., the system 1600) may again perform a nerve stimulation and data acquisition procedure.

The system 1600 may perform a nerve stimulation and data acquisition procedure according to any of the methods described herein. For example, the system 1600 may stimulate nerves (e.g., nerves which were previously ablated in a nerve ablation procedure) and measure any or all of the four hemodynamic parameters described. As described with reference to FIG. 11, FIG. 12, and/or FIG. 13, during a nerve stimulation procedure, the system may monitor the four hemodynamic measurements to determine to what extent each parameter is affected by the nerve stimulation. If a nerve ablation procedure was successful, hemodynamic parameters which previously responded to nerve stimulation may respond significantly less or not at all to nerve stimulation after the ablation procedure. In some embodiments, the system 100 may also determine an index for each hemodynamic parameter which may convey the extent of the effect of nerve stimulation on each parameter.

As shown in FIG. 18, the system may display indices from before an ablation procedure and indices after an ablation procedure for comparison. As an example, a MAP index 1812 corresponding to the change in blood pressure in response to renal nerve stimulation before an ablation procedure may be displayed. In conjunction with the MAP index 1812, a MAP index 1852 may also be displayed. The MAP index 1852 may be an index calculated based on measurements obtained after the ablation procedure. If the post-ablation MAP index 1852 differs from (e.g., is less than) the pre-ablation MAP index 1812, the ablation procedure may be deemed to have had some effect on the ablated nerve. To further assist a user of the system 100 in comparing pre-ablation indices with post-ablation indices, difference values may also be determined and displayed for a user. As an example, the difference 1842 between the pre-ablation MAP index 1812 and the post-ablation MP index 1852 may be displayed between the indices 1812 and 1852.

Similarly, a pre-ablation index, a post-ablation index, and a difference may be calculated and displayed for each hemodynamic parameter. Specifically, a pre-ablation HR index 1814 is shown along with a post-ablation HR index 1852 and a difference 1844 between the two. A pre-ablation RBF index 1816 is shown along with a post-ablation RBF index 1856 and a difference 1846 between the two. A pre-ablation RVC index 1818 is shown along with a post-ablation RVC index 1858 and a difference 1848 between the two.

Any of the indices shown and described with reference to FIG. 18 may be calculated in any suitable way. For example, the indices of FIG. 18 may be substantially similar to the index 504 described with reference to FIG. 5 and or the indices described with reference to FIG. 13. For example, the indices of FIG. 18 may be calculated by the processor circuit of the system 100 based on a comparison of a baseline value and hemodynamic value under stimulation for each respective hemodynamic parameter. The comparison of baseline and stimulation values may be similar to the calculation described with reference to FIG. 5, including equation 1 or equation 2. In this way, the change in hemodynamic parameters (both before and after ablation) under nerve stimulation may be quantified and simplified into one value.

In addition, the system 100 may be configured to determine and display whether the ablation was successful or unsuccessful. As an example of one way in which the processor circuit of the system 100 may determine that an ablation procedure was successful or unsuccessful, the processor circuit may compare any of the difference values shown in the graphical user interface 1800 to a threshold difference value. In some embodiments, a threshold different value may be assigned to each hemodynamic parameter. For example, a threshold difference value corresponding to a MAP index may be assigned, a separate threshold difference value corresponding to an HR index may be assigned, and so on. In some embodiments, if any one of the difference values shown in the interface 1800 exceed their respective threshold, the processor circuit of the system 100 may determine that the ablation procedure was successful. In other embodiments, if two or more or three or more of the difference values exceed their thresholds, the ablation procedure may be deemed a success. In some embodiments, only if all four difference values exceed their threshold is the ablation procedure a success. In other embodiments, a single threshold value may be assigned to all the parameters collectively and an average of the difference values in the interface 1800 may be compared to this threshold. Other methods of comparing difference values to a threshold are also contemplated and any suitable method may be used.

As shown in FIG. 18, the processor circuit of the system 100 may be configured to display an indicator 1860 indicating whether the ablation procedure was successful or unsuccessful. This indication 1860 may be based on any of the comparisons of the difference values of the interface 1800 with threshold values as described previously. In the embodiment shown in FIG. 18, the processor circuit of the system 100 may have determined that the ablation procedure was unsuccessful based on the comparison of the difference values with threshold values.

In addition, the processor circuit of the system 100 may be configured to recommend to a user of the system whether in ablation procedure should be repeated or not. As an example, the indicator 1862 may provide a user of the system 100 with this recommendation. Based on at least the indicator 1860, difference values shown in the graphical user interface 1800, or other comparisons of pre ablation indices and post ablation indices, the processor circuit of the system 100 may determine that an ablation procedure should be repeated or not repeated. In the example shown in FIG. 18, the processor circuit may have determined that the ablation procedure should be repeated.

The processor circuit of the system 100 may additionally be configured to recommend to a user whether the location of the ablation device should be moved to a different location within the renal artery or should be left in the same position for an additional ablation procedure. In some examples, this recommendation may be represented by the indicator 1864 in the graphical user interface in 1800. In some examples, the indicator 1864 may be determined and displayed to a user in response to a recommendation that an ablation procedure be repeated.

In some embodiments in which the processor circuit recommends that the ablation device be moved to a different location within the renal artery, the processor circuit may be additionally configured to provide a direction in which the ablation device should be moved. For example, the ablation device may be positioned at a proximal location within the renal artery. In some embodiments, the processor circuit may be configured to recommend that the user of the system 100 move the ablation device in the distal direction. In some embodiments, in some patients, efferent nerves may be positioned at a distal location along a renal artery while afferent nerves may be positioned at a proximal location along the renal artery. For example, efferent nerves may be positioned closer to a kidney of the patient. Afferent nerves may be positioned closer to the aorta of the patient. Based on this anatomy, the processor circuit of the system 100 may recommend to a user to move the ablation device in a distal or proximal direction depending on the likelihood of finding efferent nerves or afferent nerves.

Figure 19:
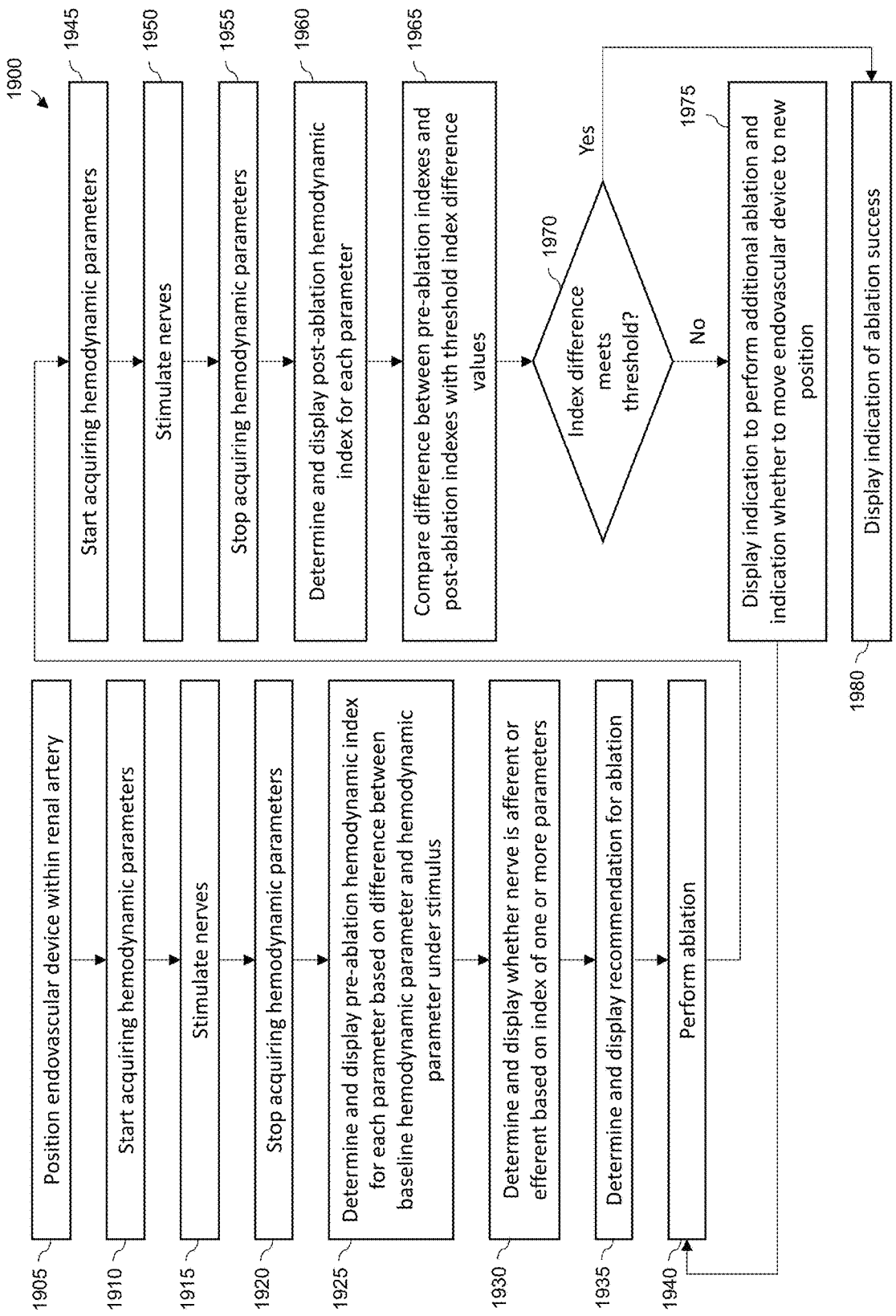
FIG. 19 is a flow diagram of a method of a guided renal denervation procedure, according to aspects of the present disclosure.

FIG. 19 is a flow diagram of a method 1900 of guided renal denervation, according to aspects of the present disclosure. As illustrated, the method 1900 includes a number of enumerated steps, but embodiments of the method 1900 may include additional steps before, after, or in between the enumerated steps. In some embodiments, one or more of the enumerated steps may be omitted, performed in a different order, or performed concurrently. The steps of the method 1900 can be carried out by any suitable component within the diagnostic system 100 and all steps need not be carried out by the same component. In some embodiments, one or more steps of the method 1900 can be performed by, or at the direction of, a processor circuit of the diagnostic system 100, including, e.g., the processor 2060 (FIG. 20) or any other component.

At step 1905, the method 1900 includes positioning an endovascular device within a renal artery. The endovascular device may be any of the devices described herein. In one example, the endovascular device may be the device 902 described with reference to FIG. 16.

At step 1910, the method 1900 includes starting to acquire hemodynamic parameters. The step 1910 may correspond to the endovascular device 902 (or another device) beginning to acquire hemodynamic data. This data may be acquired by various sensors, such as the flow sensor 124 of the device 902 or the pressure sensor 924 of the device 902 (FIG. 9). In some embodiments, this data may be received by the data acquisition subsystem 101 and/or the control system 130. Based on this received data, the process circuit of the system 100 may generate one or more plots, such as any of those shown and describe with reference to FIG. 5, FIG. 11, FIG. 12, and/or FIG. 15. For example, mean arterial pressure data, heart rate data, renal blood flow data, and/or renal vascular conductance data may be generated based on the data received from the flow sensor 124 and/or pressure sensor 924 of the device 902 (FIG. 9) or other devices. In some embodiments, acquired data before nerve stimulation may correspond to stabilized or baseline data, such as that shown in the phase 1510 of FIG. 15.

At step 1915, the method 1900 includes stimulating the renal nerves. The renal nerves may be stimulated by a nerve stimulation assembly such as any of those described herein. As the renal nerves are stimulated, hemodynamic data may continue to be acquired and stored in a memory in communication with the processor circuit of the system 100 (e.g., the processor circuit 2060 of FIG. 20). In some instances, changes in hemodynamic parameters may be observed as the renal nerves are stimulated. In some embodiments, like the embodiment described with reference to FIG. 14 and FIG. 15, hemodynamic data may be used by the data acquisition subsystem 101 to direct the nerve stimulation subsystem 151 when to continue stimulating renal nerves and when to stop stimulation renal nerves. For example, when hemodynamic parameters have reached a stable state, or are not changing for a period of time, the nerve stimulation subsystem 151 may be instructed to stop stimulating the renal nerves.

At step 1920, the method 1900 includes stopping acquiring hemodynamic parameters. After stimulation and after the hemodynamic parameters have returned to a similar value as the baseline values of the parameters before nerve stimulation, the system 100 may stop acquiring data. All acquired data may be stored in a memory in communication with the processor circuit.

At step 1925, the method 1900 includes determining and displaying a pre-ablation hemodynamic index for each parameter based on the difference between the baseline hemodynamic parameter and the hemodynamic parameter under stimulus. For example, the system 100 may determine an index for each of a mean arterial pressure, a heart rate, a renal blood flow, and a renal vascular conductance. These indices may be pre-ablation indices because an ablation procedure has not been performed at the time the data used to generate the indices was acquired.

At step 1930, the method 1900 includes determining and displaying whether a nerve is afferent or efferent based on the index of one or more parameters. For example, the processor circuit of the system 100 may compare the index of the mean arterial pressure and/or the heart rate and compare them to a threshold index. The processor circuit may similarly compare the renal blood flow and/or the renal vascular conductance to respective threshold values. Based on these comparisons, the circuit may determine that the stimulated nerve is afferent or efferent. As an example, if the indices of mean arterial pressure and heart rate do not meet their respective threshold(s) and/or if the indices of renal blood flow and renal vascular conductance do meet their respective threshold(s), the processor circuit may determine that the stimulated nerve is an efferent nerve. In some embodiments, if the indices of mean arterial pressure and heart rate meet their respective threshold(s) and/or if the indices of renal blood flow and renal vascular conductance do not meet their respective threshold(s), the processor circuit may determine that the stimulated nerve is an afferent nerve. As described, in the case in which a renal nerve is determined to be afferent, the processor circuit may indicate this to the user via a display. In some embodiments, the processor circuit may also indicate via the display that the user should move the nerve stimulation device (e.g., the device 902) to a different location within the renal artery and repeat the steps 1910 through 1925. This process may be repeated as many times as necessary until an efferent nerve is identified. Additional aspects of the step 1930 may include determining whether the patient under a nerve stimulation procedure is a good candidate for a nerve denervation procedure. In this case, the processor circuit of the system 100 may determine, after, for example, exceeding a predetermined number of iterations of the steps 1910 through 1930 and determining that nerves are either afferent or that none of the nerves are responding to nerve stimulation, that the patient under nerve stimulation is not a good candidate for renal denervation. In this example, the processor circuit of the system 100 may display a recommendation that a renal denervation procedure not be conducted and that the procedure be terminated. In this case, the method 1900 may not continue to the step 1935.

At step 1935, the method 1900 includes determining and displaying a recommendation for ablation. This ablation may be a future ablation, including a first, second, third or additional renal denervation procedure. This recommendation, as previously described, may be in response to the processor circuit determining that an efferent nerve has been located. In other embodiments, it may be in response to one or more (e.g., all) of the hemodynamic parameters responding to meet respective thresholds in response to nerve stimulation.

At step 1940, the method 1900 includes performing an ablation procedure. An ablation procedure may be performed as described with reference to FIG. 16 and FIG. 17. For example, an electrical pulse may be emitted into the patient anatomy intended to disable the renal nerves at the identified location. After the ablation procedure, a nerve stimulation and measurement procedure may be again performed to compare values before and after the ablation procedure to determine if the ablation procedure was effective.

At step 1945, the method 1900 includes starting to acquire hemodynamic parameters. The step 1945 may be similar to the step 1910 except that the step 1910 occurs before an ablation procedure and the step 1945 occurs after.

At step 1950, the method 1900 includes stimulating the renal nerves. Like the step 1945 and the step 1910, the step 1950 and the step 1915 may be similar but performed after and before the ablation procedure respectively.

At step 1955, the method 1900 includes stopping acquiring hemodynamic parameters. Like the step 1945 and the step 1910, the step 1955 and the step 1920 may be similar but performed after and before the ablation procedure respectively.

At step 1960, the method 1900 includes determining and displaying a post-ablation hemodynamic index for each parameter. Any of the indices associated with the post-ablation data received at steps 1945 through 1955 may be calculated in any of the ways previously described. At step 1960, an aspect of the method 1900 may also include comparing pre-ablation indices with post-ablation indices. As described with reference to FIG. 18, for each parameter a difference between a pre-ablation index and a post-ablation index may be determined. This difference value may indicate the success or level of effectiveness of the ablation procedure on the response of the renal nerves.

At step 1965, the method 1900 includes comparing the difference between pre-ablation indices and post-ablation indices with threshold index difference values. As described with reference to FIG. 18, this comparison may be done in any way, including a comparison of indices of individual parameters or the parameters as a whole.

At step 1970, the method 1900 includes determining whether an index or multiple indices meet a threshold. The threshold may be any suitable threshold, as described with reference to FIG. 18. The determined answer at step 1970 may dictate which steps are taken next at this point of the method 1900. As an example, if the index difference did not meet the threshold, the method 1900 may progress to the step 1975. If, however, the index difference did meet the threshold, the method 1900 may instead progress to the step 1980.

At step 1975, the method 1900 includes displaying an indication to perform an additional ablation procedure and indicating whether to move the endovascular device to a new position or to leave it in the same position. These indications may be displayed as a result of the index difference of one or more parameters not meeting a threshold value. After the user of the system moves the device to a new location if recommended or if desired, the method 1900 may return to the step 1940 at which an ablation may be performed again. After the ablation is performed, the method 1900 may then include performing the steps 1945 through 1970 again to determine whether the additional ablation was effective or not. If it was not, the method may revert to the step 1940 and the process may be repeated. This process may be repeated any number of times. In some embodiments, the processor circuit of the system 100 may be configured to display to a user after a certain number of unsuccessful ablations that an additional ablation is not recommended and that the procedure should be aborted.

After an ablation procedure is considered successful, however, the method may proceed to the step 1980. At the step 1980, the method 1900 includes displaying to a user that the ablation procedure was successful. This display may include any suitable plots, such as those shown and described previously, any numerical values, images, or any other data described herein in any form. In some embodiments, the processor circuit may direct a user to move the device to a new location and perform an additional ablation procedure or may direct the user to end the procedure.

FIG. 20 is a schematic diagram of a processor circuit, according to aspects of the present disclosure. The processor circuit 2010 may be implemented in the control system 130 (e.g., as shown in FIG. 1, FIG. 6, FIG. 9, FIG. 14, and/or FIG. 16), or any other suitable location. In an example, the processor circuit 2010 may be in communication with any of the devices, systems, or subsystems described in the present disclosure. For example, the processor circuit 2010 may be in communication with a blood flow sensing device, a pressure sensing device, an intraluminal imaging device, an extraluminal imaging device, a nerve stimulation device, a nerve ablation device or any other device, system, or subsystem. The processor circuit 2010 may include a processor 106 and/or a communication interface. One or more processor circuits 2010 are configured to execute the operations described herein. As shown, the processor circuit 2010 may include a processor 2060, a memory 2064, and a communication module 2068. These elements may be in direct or indirect communication with each other, for example via one or more buses.

The processor 2060 may include a CPU, a GPU, a DSP, an application-specific integrated circuit (ASIC), a controller, an FPGA, another hardware device, a firmware device, or any combination thereof configured to perform the operations described herein. The processor 2060 may also be implemented as a combination of computing devices, e.g., a combination of a DSP and a microprocessor, a plurality of microprocessors, one or more microprocessors in conjunction with a DSP core, or any other such configuration.

The memory 2064 may include a cache memory (e.g., a cache memory of the processor 2060), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 2064 includes a non-transitory computer-readable medium. The memory 2064 may store instructions 2066. The instructions 2066 may include instructions that, when executed by the processor 2060, cause the processor 2060 to perform the operations described herein with reference to any of the devices, system, or subsystems described. Instructions 2066 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The communication module 2068 can include any electronic circuitry and/or logic circuitry to facilitate direct or indirect communication of data between the processor circuit 2010, the devices, systems, or subsystems described herein, the display 108, processor circuit 106, or user input device 104 (FIG. 1). In that regard, the communication module 2068 can be an input/output (I/O) device. In some instances, the communication module 2068 facilitates direct or indirect communication between various elements of the processor circuit 2010 and/or various described endovascular or extraluminal devices, systems, and/or the host 130 (FIG. 1).

Persons skilled in the art will recognize that the apparatus, systems, and methods described above can be modified in various ways. Accordingly, persons of ordinary skill in the art will appreciate that the embodiments encompassed by the present disclosure are not limited to the particular exemplary embodiments described above. In that regard, although illustrative embodiments have been shown and described, a wide range of modification, change, and substitution is contemplated in the foregoing disclosure. It is understood that such variations may be made to the foregoing without departing from the scope of the present disclosure. Accordingly, it is appropriate that the appended claims be construed broadly and in a manner consistent with the present disclosure.

What is claimed is:

1. A system, comprising:
a processor circuit configured for communication with an endovascular flow sensor, an endovascular pressure sensor, and an endovascular nerve stimulation device, wherein the processor circuit is configured to:
receive first and second endovascular flow measurements obtained by the endovascular flow sensor while the endovascular flow sensor is positioned within a blood vessel of the patient;
receive first and second endovascular pressure measurements obtained by the endovascular pressure sensor while the endovascular pressure sensor is positioned within the blood vessel;

control the endovascular nerve stimulation device to stimulate a nerve of the patient, wherein the nerve is proximate to the blood vessel, wherein the first endovascular flow measurement and the first endovascular pressure measurement are obtained before the nerve is stimulated, wherein the second endovascular flow measurement and the second endovascular pressure measurement are obtained while the nerve is stimulated;

determine whether the nerve is afferent or efferent based on the first and second endovascular flow measurements and the first and second endovascular pressure measurements; and provide an output to a display in communication with the processor circuit, wherein output comprises an identification, for a user, of the nerve as afferent or efferent.

2. The system of claim 1,
wherein the blood vessel comprises a renal artery, and
wherein the nerve comprises a renal nerve.

3. The system of claim 1, wherein the nerve stimulation device includes at least one electrode.

4. The system of claim 1,
further comprising one or more endovascular catheter or guidewires configured to be positioned within the blood vessel,
wherein each of the one or more the endovascular catheter or guidewires comprises at least one of the endovascular flow sensor, the endovascular pressure sensor, or the endovascular nerve stimulation device.

5. The system of claim 1, further comprising:
a first endovascular catheter or guidewire configured to be positioned within the blood vessel, wherein the first endovascular catheter or guidewire comprises the endovascular flow sensor and the endovascular pressure sensor; and
a second endovascular catheter or guidewire configured to be positioned within the blood vessel, wherein the second endovascular catheter or guidewire comprises the endovascular nerve stimulation device.

6. The system of claim 1,
further comprising an endovascular catheter or guidewire configured to be positioned within the blood vessel, and
wherein the endovascular catheter or guidewire comprises the endovascular flow sensor, the endovascular nerve stimulation device, and the endovascular pressure sensor.

7. The system of claim 1, wherein the processor circuit is configured to control the stimulation of the nerve by the endovascular nerve stimulation device based on at least one of the first endovascular flow measurement or a second endovascular flow measurement.

8. The system of claim 1,
wherein, to perform the comparison, the processor circuit is configured to determine an index based on the first endovascular flow measurement and the second endovascular flow measurement, and
wherein the output comprises a visual representation of the index.

9. The system of claim 1, wherein the processor circuit is configured to perform a comparison based on the first endovascular flow measurement and the second endovascular flow measurement.

10. The system of claim 9, wherein the comparison comprises a determination of whether a difference between the first endovascular flow measurement and the second endovascular flow measurement exceeds a threshold difference.

11. The system of claim 9,
wherein the comparison comprises a determination of whether denervation is recommended for the patient, and
wherein the output comprises a visual representation of the determination.

12. The system of claim 9,
wherein the comparison comprises a determination of whether a denervation was successful, and
wherein the output comprises a visual representation of the determination.

13. The system of claim 9, wherein the comparison is further based on the first and second endovascular pressure measurements.

14. The system of claim 9,
wherein the processor circuit is configured to determine a heart rate of the patient based on the endovascular pressure measurement,
wherein the comparison is further based on the heart rate, and
wherein the output comprises a visual representation of the heart rate.

15. The system of claim 9,
wherein the processor circuit is configured to determine a vascular conductance of the patient based on:
at least one of the first endovascular pressure measurement or the second endovascular pressure measurement; and
at least one of the first endovascular flow measurement or the second endovascular flow measurement,
wherein the comparison is further based on the vascular conductance, and
wherein the output comprises a visual representation of the vascular conductance.

16. The system of claim 1, wherein the output comprises:
a visual representation of the first and second endovascular flow measurements; and
a visual representation of the first and second endovascular pressure measurements.

17. The system of claim 1,
wherein the processor circuit is configured to determine that the nerve is afferent when a change between the first and second endovascular pressure measurements is relatively larger and a change between the first and second endovascular flow measurements is relatively smaller,
wherein the processor circuit is configured to determine that the nerve is efferent when a change between the first and second endovascular pressure measurements is relatively smaller and a change between the first and second endovascular flow measurements is relatively larger.

* * * * *